United States Patent [19]
Nakane et al.

[11] Patent Number: 5,797,474
[45] Date of Patent: Aug. 25, 1998

[54] CLUTCH DISC

[75] Inventors: Mototaka Nakane, Toyota; Kiyonori Kobayashi, Chiryu, both of Japan

[73] Assignee: Aisin Seiki Kabushiki Kaisha, Kariya, Japan

[21] Appl. No.: 665,813

[22] Filed: Jun. 19, 1996

[30] Foreign Application Priority Data

Jun. 30, 1995 [JP] Japan ................... 7-188645

[51] Int. Cl.$^6$ .............................. F16D 13/64; F16D 1/06
[52] U.S. Cl. .................... 192/207; 192/200; 192/209; 464/59; 464/99
[58] Field of Search ....................... 192/207, 209, 192/200, 70.17, 70.18; 464/59, 60, 98, 99

[56] References Cited

U.S. PATENT DOCUMENTS

| | | | |
|---|---|---|---|
| 2,141,014 | 12/1938 | Nutt | 192/207 |
| 2,407,757 | 9/1946 | MacCallum | 464/98 X |
| 3,387,505 | 6/1968 | Rumsey. | |
| 3,759,066 | 9/1973 | Portnoy | 464/59 |
| 4,044,628 | 8/1977 | Jacks | 464/59 X |
| 4,795,012 | 1/1989 | Durum | 192/207 X |
| 5,147,246 | 9/1992 | Focqueur et al. | 192/207 X |
| 5,322,149 | 6/1994 | Szadkowski | 192/70.17 |

FOREIGN PATENT DOCUMENTS

| | | |
|---|---|---|
| 0 341 133 | 11/1989 | European Pat. Off. . |
| 64-14942 | 1/1989 | Japan . |
| 3-66922 | 3/1991 | Japan . |
| 461732 | 7/1936 | United Kingdom . |
| 2 087 043 | 5/1982 | United Kingdom . |

Primary Examiner—Rodney H. Bonck
Attorney, Agent, or Firm—Burns, Doane, Swecker & Mathis, LLP

[57] ABSTRACT

A clutch disc is constructed to achieve superior performance by increasing the allowable torque or the angle of torsion of the damper plate. The clutch disc includes a clutch hub, a disc spring, and the damper plate interposed between the clutch hub and the disc spring. The damper plate is provided with an arc-like slit. In a portion of the slit proximate to the end of the slit at the peripheral or the inner peripheral side of the damper plate, the slit is centrifugally curved or curved toward the clutch axis such that both ends thereof are close to a radius of a concentric circle. According to another aspect of the invention, the damper plate is provided with a plurality of first rivets and a plurality of first rivet holes. The radii of the first rivet holes gradually decrease as the distance between the clutch axis and each hole decreases, whereas the radii increase gradually as the distance between the clutch axis and each hole increases. According to a further aspect of the invention, several damper plates are provided and there is a dislocation between the inner periphery of each damper plate and the periphery of the damper plate in the direction parallel with the clutch axis so that the damper plates have a certain thickness in the direction parallel with the clutch axis.

20 Claims, 22 Drawing Sheets

FIG. 20 PRIOR ARTS

PRIOR ARTS

FIG. 22    PRIOR ARTS
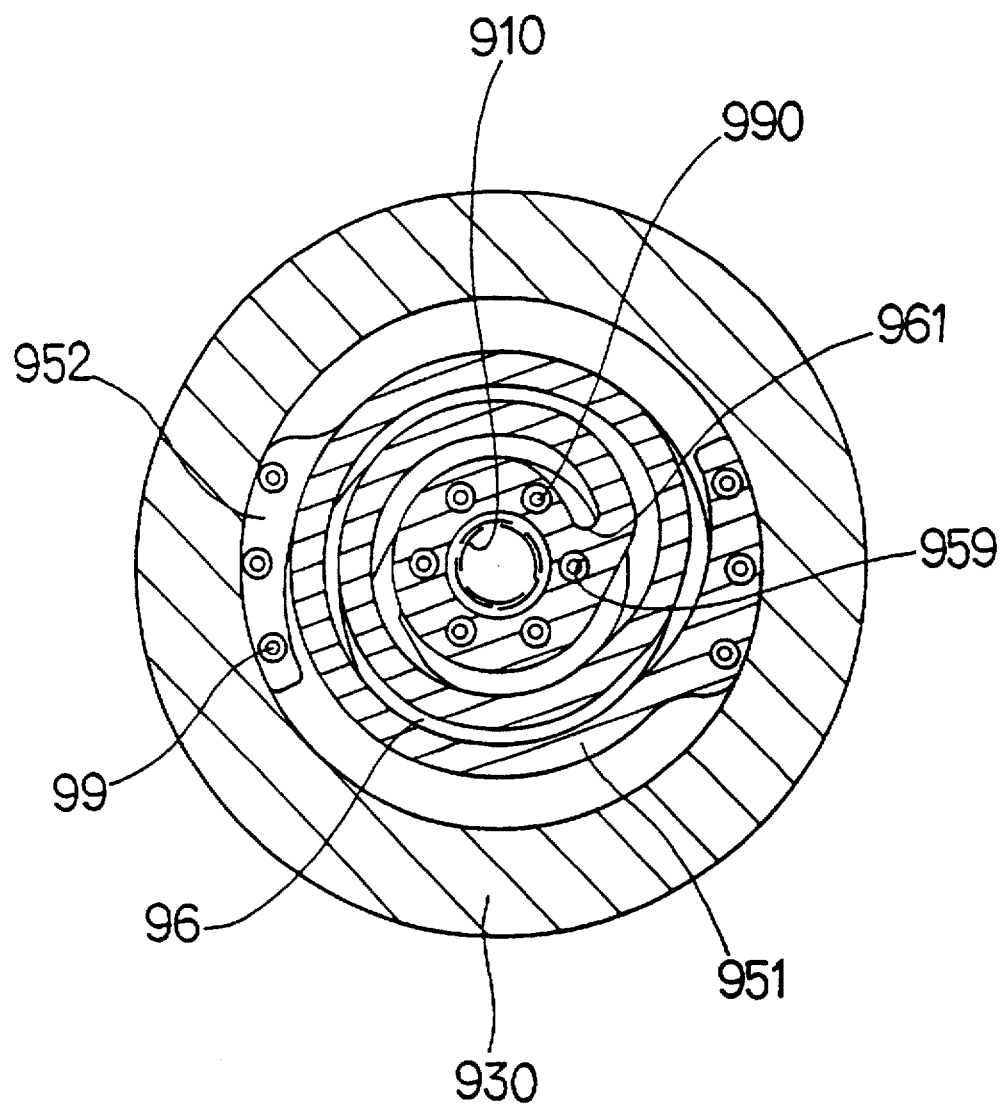

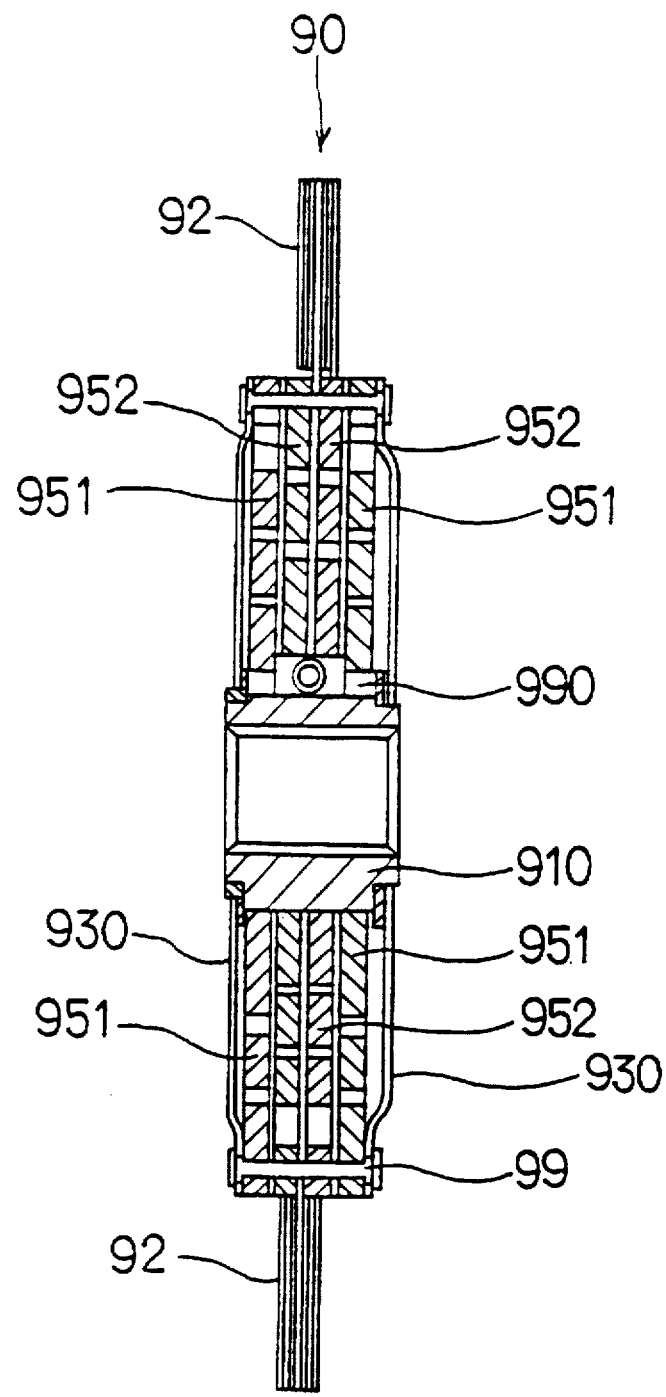
FIG. 23 PRIOR ARTS

CLUTCH DISC

BACKGROUND OF THE INVENTION

1. Field of the Invention

The present invention relates to a clutch disc for use in a friction clutch, and more particularly to a clutch disc capable of increasing an allowable torque of a damper member or an angle of torsion thereof.

2. Description of the Related Arts (Conventional Art)

Heretofore, a dry clutch for a manual transmission is adopted as a friction clutch for use in a vehicle. The dry clutch has two types, one is a dry single clutch comprising a clutch disc combined with a pressure plate and the other is a dry multiple clutch comprising a plurality of dry single clutches.

As shown in FIG. 20, a clutch disc 90 comprises a clutch hub 91 connected with an output shaft (input shaft of a transmission), a disc spring 93 (sub-plate 931) on which a clutch facing 92 has been mounted, and a damper member 94 interposed between the clutch hub 91 and the disc spring 93. Reference numeral 99 in FIG. 20 denotes a rivet pin which connects the disc spring 93 and the damper member 94 with each other.

The damper member 94 transmits a torque between the clutch hub 91 and the disc spring 93 (sub-plate 931), thus applying a torsional characteristic to the clutch disc. The torsional characteristic changes torsional rigidity to be generated by the relative torsion of the damper member 94 in a single stage or multiple stages. It is known that hysteresis characteristic is applied to the torsional characteristic by means of a friction member mounted on the face of contact between the clutch hub 91 and the disc spring 93 (sub-plate 931), as will be described later with reference to FIG. 15.

A damper member comprising a coil spring or a torsion rubber is known. As shown in FIG. 21, a damper member comprising a damper plate 95 having a spiral slit 96 formed thereon is also known. Reference numeral 991 in FIG. 21 denotes a rivet hole through which the rivet pin 99 (see FIG. 20) is inserted.

A damper member as shown in FIG. 22 is also known. The damper member comprises damper plates 951 and 952 provided symmetrically between the clutch hub 910 and the disc spring 930 by inverting one damper plate with respect to the other damper plate by 180 degrees. Reference numeral 990 in FIG. 22 denotes a rivet connecting the clutch hub 910 and the damper plates 951 and 952 with each other.

A damper member comprising two pairs of the damper plates 951 and 952 to provide a two-stage torsional characteristic is also known as shown in FIG. 23.

The conventional damper members comprising the damper plate have, however, the following problems.

One of the problems is that in order to increase the angle of torsion of the damper plate (damper member) and the allowable torque thereof, the size or weight of the damper plate should be increased.

For example, in order to increase a maximum angle of torsion θm, the width ws of the slit of the damper plate shown in FIG. 21 is required to be increased. The increase in the width, however, reduces the total area of the spiral plate 950, thus resulting in decreasing a maximum allowable torque Tm.

The maximum allowable torque Tm is determined by the width wp of the spiral plate 950 defined by the slit 96 formed therein and the thickness thereof. The allowable angle of torsion θm is determined by the width wp of the spiral plate 950 and the length (L) thereof. Thus, in order to increase the allowable angle of torsion θm as well as retaining the allowable torque Tm, it is necessary to increase the diameter of the damper plate as a whole.

If the width wp and the length (L) of the belt-like elastic plate 950 are increased in order to increase the maximum allowable torque Tm and the allowable angle of torsion θm keeping the thickness and size of the damper plate unchanged, the width ws of the slit 96 is required to be reduced. If the width ws of the slit 96 is reduced, adjacent portions of the spiral plate 950 interfere with each other owing to the radial movement of the adjacent portions having the width wp caused by a torsion applied to the spiral plate 950. Consequently, the damper plate has a reduced maximum allowable angle of torsion θm (first problem.)

A stress generated by a force applied to the damper plate 95 is maximum at the inner peripheral end of the slit 96 and the peripheral end thereof, as shown by reference numeral 961 in FIGS. 21 and 22. That is, as shown in FIG. 3, a stress (S) concentrates on a portion, shown by an arrow (Y), of the inner peripheral end 961 of the slit 96. In order to prevent the stress from concentrating on the end 961 of the slit 96, it is necessary to allow the peripheral line of the end 961 to have a small curvature along the direction in which the stress (S) is applied. That is, it is necessary to allow the end 961 to have a great size. In order to do so, it is necessary to allow the slit 96 to have a great width, which means that the spiral plate 950 has a reduced width wp. Accordingly, the damper member has a reduced maximum allowable torque Tm (second problem.)

In order to increase the product of the width wp and the length (L) of the long spiral elastic member comprising the damper plates 951 and 952 having insertion holes 959, through which the rivets are inserted, formed at the inner periphery of the spiral elastic member, with the outer diameter thereof fixed to a certain value, it is necessary to reduce the diameter of a circle C1 positioned at the inner periphery of the spiral elastic member and having the rivets 990 arranged thereon. On the other hand, because it is necessary to secure the strength of the rivet 990 and portions, of the damper plates 951 and 952, proximate to the rivet hole 959, it is difficult to make the diameter of the rivet 990 too small. Therefore, there is a limitation in the degree in reduction of the diameter of the circle C1 on which the rivets 990 are arranged and the diameter of the inner circle of the damper plates 951 and 952. This is a principal factor for which the maximum angle of torsion θm and the allowable torque Tm cannot be increased (third problem.)

In order to apply a hysteresis characteristic to the torsional characteristic, it is necessary to provide a friction member for generating a frictional force between the damper plate and the clutch hub or between the damper plate and the disc spring. As a result, the weight of the clutch disc increases as well as the manufacturing cost. (fourth problem)

If the clutch disc has a multi-stage torsional characteristic, it is unnecessary to apply the hysteresis characteristic to the torsional characteristic in a low torque region, but rather, preferably, no hysteresis characteristic is applied thereto. But if the friction member is provided between the damper plate and the clutch hub or between the damper plate and the disc spring, hysteresis is necessarily generated in the low torque region. (additional problem resulted from the fourth problem)

SUMMARY OF THE INVENTION

The present invention has been developed to solve the above-described problems, and it is accordingly an object of the present invention to provide a clutch disc having a superior performance of increasing an allowable torque or an angle of torsion of the damper plate. supposing that the volume and weight thereof are fixed.

The clutch disc, according to the present invention, constituting a friction clutch comprises a clutch hub connected with an output shaft. a disc spring having a clutch facing mounted on a peripheral side thereof, and a damper member interposed between the clutch hub and the disc spring, thus applying a torsional characteristic to the clutch disc.

The damper member has a single or a plurality of elastically deformable damper plates.

The damper plate is formed of an annular elastic material. a surface of which is perpendicular to a clutch axis and has a plurality of arc-like slits formed thereon centrifugally spirally in a range from an inner peripheral side of the annulus toward a peripheral side thereof.

The arc-like slit has a curved portion formed by centrifugally curving a portion of the slit proximate to an end thereof at the peripheral side of the annulus such that the end of the slit is close to a radius of a concentric circle and/or a curved portion formed by curving a portion of the slit proximate to an end thereof toward the center of a concentric circle at the inner peripheral side of the annulus such that the end of the slit is close to a radius of the concentric circle.

BRIEF DESCRIPTION OF THE DRAWINGS

FIG. 22 is a front view showing another damper plate of a conventional clutch disc; and FIG. 23 is a side sectional view showing another conventional clutch disc.

DETAILED DESCRIPTION OF THE INVENTION

Figure 1:
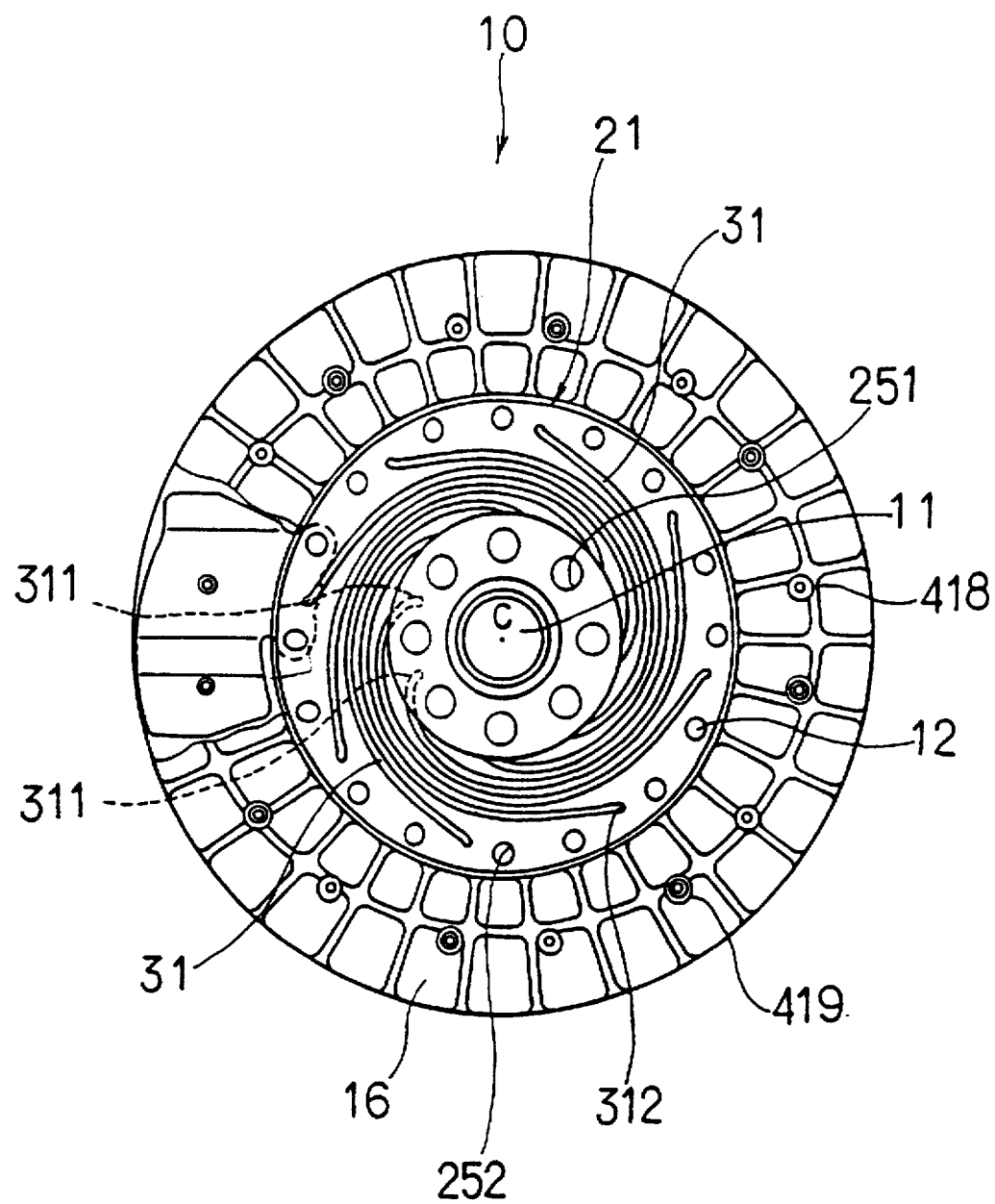
FIG. 1 is a front sectional view showing a clutch disc according to a first example (sectional view taken along the line X—X of FIG. 2)

A clutch disc, according to a first invention, constituting a friction clutch comprises a clutch hub connected with an output shaft, a disc spring having a clutch facing mounted on a peripheral side thereof, and a damper member interposed between the clutch hub and the disc spring, thus applying a torsional characteristic to the clutch disc.

The damper member has a single or a plurality of elastically deformable damper plates.

The damper plate is formed of an annular elastic material, a surface of which is perpendicular to a clutch axis and has a plurality of arc-like slits formed thereon centrifugally spirally in a range from an inner peripheral side of the annulus toward a peripheral side thereof.

The arc-like slit has a curved portion formed by centrifugally curving a portion of the slit proximate to an end thereof at the peripheral side of the annular damper plate such that the end of the slit is close to a radius of a concentric circle and/or a curved portion formed by curving a portion of the slit proximate to an end thereof toward the center of a concentric circle at the inner peripheral side of the annular damper plate such that the end of the slit is close to a radius of the concentric circle.

The first invention is characterized in that in the arc-like slit formed on the annular damper plate, in a region proximate to the end of the slit at the peripheral side of the annular damper plate, the slit is centrifugally curved such that the end thereof is close to a radius of a concentric circle, whereas in a region proximate to the end of the slit at the inner peripheral side of the annular damper plate, the slit is curved toward the center of a concentric circle such that the end thereof is close to a radius of the concentric circle.

Supposing that the damper plate is connected with the clutch hub and the disc spring by means of the rivet pin, preferably, the damper plate has a plurality of first rivet holes through which rivets for fixing the damper plate to the clutch hub are inserted and which are formed in proximity to the inner peripheral side of the annulus and a plurality of second rivet holes through which rivets for fixing the damper plate to the disc spring are inserted and which are formed in proximity to the peripheral side thereof. The first and second rivet holes are formed at regular intervals concentrically, respectively. In this construction, an inner end of the arc-like slit is curved to be close to the radius, of the concentric circle, positioned approximately intermediate between the adjacent first rivet holes, and an outer end of the arc-like slit is curved to be close to the radius, of the concentric circle, positioned approximately intermediate between the adjacent second rivet holes.

The strengths of portions of the damper plate proximate to the rivet holes can be allowed to be uniform against the stress of the damper plate by arranging the rivet holes as described above.

A clutch disc, according to the second invention, constituting a friction clutch comprises a clutch hub connected with an output shaft, a disc spring having a clutch facing mounted on a peripheral side thereof, and a damper member interposed between the clutch hub and the disc spring, thus applying a torsional characteristic to the clutch disc.

The damper member has at least one elastically deformable damper plate.

The damper plate is formed of an annular elastic material, a surface of which is perpendicular to a clutch axis and has an arc-like slit formed thereon centrifugally spirally in a range from an inner peripheral side of the annulus toward a peripheral side thereof and has a plurality of first rivet holes through which rivets for fixing the damper plate to the clutch hub are inserted and which are formed in proximity to the inner peripheral side of the annulus. The first rivet holes and the rivets are centrifugally spirally arranged along portions of the arc-like slit positioned in proximity to the inner peripheral side of the annulus by gradually increasing the distance between the clutch axis and each of the first rivet holes such that the radii (r) of the first rivet holes decrease as the distance between the clutch axis and each thereof decreases and the radii (r) thereof increase as the distance between the clutch axis and each thereof increases.

The second invention is characterized in that the first rivet holes and the rivets positioned at the inner peripheral side of the annular damper plate are centrifugally spirally arranged along portions of the arc-like slit positioned in proximity to the inner peripheral side of the annulus in such a manner that the radii (r) of the first rivet holes decrease as the distance between the clutch axis and each thereof decreases and the radii (r) thereof increase as the distance between the clutch axis and each thereof increases.

The construction of the second invention is applicable to the friction clutch of the first invention, and the advantage of the first invention and that of the second invention can be obtained in combination.

A clutch disc, according to the third invention, constituting a friction clutch comprises a clutch hub connected with an output shaft, a disc spring having a clutch facing mounted on a peripheral side thereof, and a damper member interposed between the clutch hub and the disc spring, thus applying a torsional characteristic to the clutch disc.

The damper member has at least one elastically deformable damper plate.

The damper plate is formed of an annular deformable material, a surface of which is perpendicular to a clutch axis and has a plurality of arc-like cut lines or a plurality of arc-like slits formed thereon in a range from an inner peripheral side of the annulus toward a peripheral side thereof such that there is a dislocation between the inner periphery of the annulus and the periphery thereof in a direction parallel with the clutch axis to cause adjacent structures centrifugally spirally formed by the presence of the arc-like cut lines or the arc-like slits to be dislocated from each other in the axial direction of the clutch axis, so that when the adjacent structures are dislocated radially from each other as a result of circumferential twists applied thereto, the arc-like cut lines or the arc-like slits do not interfere with each other. The structures are formed of an elastically deformable material, respectively.

The third invention is characterized in that each damper plate is formed of an annular deformable material, a surface of which is perpendicular to a clutch axis and has a plurality of arc-like cut lines or a plurality of arc-like slits formed thereon in a range from an inner peripheral side of the annulus toward a peripheral side thereof such that there is a dislocation between the inner periphery of the annulus and the periphery thereof in a direction parallel with the clutch axis to form a thickness in the axial direction of the damper member. The structure thus formed increases the width of the arc-like cut lines or the arc-like slits. The structures are formed of an elastically deformable material.

In the third invention, preferably, an elastic return force is applied between the inner periphery of the annulus and the periphery thereof in the axial direction thereof so as to apply a thrust load between the damper plate and the clutch hub.

Hysteresis characteristic can be applied to the torsional characteristic by applying an elastic return force between the inner periphery of the annulus and the periphery thereof, which eliminates the need for the provision of a friction and allows the clutch disc to be light and manufacturing cost to be reduced.

The construction of the third invention is applicable to the friction clutch of the first invention or the second invention, and thus the advantage of the first, second, and third inventions can be obtained in combination.

A clutch disc, according the fourth invention, constituting a friction clutch comprises a clutch hub connected with an output shaft, a disc spring having a clutch facing mounted on a peripheral side thereof, and a damper member interposed between the clutch hub and the disc spring, thus applying a torsional characteristic to the clutch disc.

The damper member has at least one elastically deformable damper plate. The damper plate is formed of an annular elastic material, a surface of which is perpendicular to a clutch axis and has a plurality of arc-like slits formed thereon centrifugally spirally in a range from an inner peripheral side of the annulus toward a peripheral side thereof such that the damper plate has long and narrow plates formed between the adjacent arc-like cut lines or between the adjacent arc-like slits by inclining the long and narrow plates with respect to a horizontal plane perpendicular to the clutch axis so as to axially space from each other faces of the long and narrow plates formed by the presence of the arc-like cut lines or the arc-like slits by more than the thicknesses of the long and narrow plates. The structures comprising the long and narrow plates are formed of an elastically deformable material.

The fourth invention is characterized in that the damper member has at least one elastically deformable damper plate and that the damper plate is formed of an annular elastic material, a surface of which is perpendicular to a clutch axis and has a plurality of arc-like slits formed thereon centrifugally spirally in a range from an inner peripheral side of the annulus toward a peripheral side thereof such that the damper plate has long and narrow plates formed between the adjacent arc-like cut lines or between the adjacent arc-like slits by inclining the long and narrow plates with respect to a horizontal plane perpendicular to the clutch axis so as to axially space from each other faces of the long and narrow plates formed by the presence of the arc-like cut lines or the arc-like slits by more than the thicknesses of the long and narrow plates. In this configuration, when the adjacent long and narrow plates are dislocated radially from each other as a result of circumferential twists applied thereto, they do not interfere with each other. The structure comprising the long and narrow plates are formed of an elastically deformable material.

The construction of the fourth invention is applicable to the friction clutch of the first invention or the second invention, and thus the advantage of the first, second, and third inventions can be obtained in combination. The arc-like slit of the first through fourth inventions may be single or plural.

A clutch disc, according the fifth invention, constituting a friction clutch comprises a clutch hub connected with an output shaft, disc springs each having a clutch facing mounted on a peripheral side thereof, and damper members each interposed between the clutch hub and the disc spring, thus applying a torsional characteristic to the clutch disc, stopper plates each fixed to the disc spring or the clutch hub, and stopper members each fixed to the stopper plate at an unfixed side thereof or to the clutch hub.

The damper member has at least one elastically deformable damper plate.

The stopper plate has at the unfixed side thereof a plurality of play interval-provided cut-out portions or a plurality of play interval-provided engaging holes, each of which has an interval greater than a predetermined interval between each of the stopper members and an edge of each thereof when the angle of torsion of the damper member is zero, and the edge of each of which is brought into contact with each of the stopper members when the angle of torsion of the damper member has reached a predetermined one.

The fifth invention is characterized in that the clutch disc has the stopper plates each fixed to the disc spring or the clutch hub, and the stopper members each fixed to the stopper plate at an unfixed side thereof or to the clutch hub; the damper member has a single or a plurality of elastically deformable damper plates; and the stopper plate has at the unfixed side thereof a plurality of play interval-provided cut-out portions or a plurality of play interval-provided engaging holes, each of which has an interval greater than a predetermined interval between each of the stopper members and an edge of each thereof when the angle of torsion of the damper member is zero, and the edge of each of which is brought into contact with each of the stopper members when the angle of torsion of the damper member has reached a predetermined one.

The construction of the fifth invention is applicable to the friction clutch of the first through fourth inventions and thus the advantage of the first through fourth inventions can be obtained in combination.

According to the sixth invention, a clutch disc constituting a friction clutch comprises a clutch hub connected with an output shaft, disc springs each having a clutch facing mounted on a peripheral side thereof, and damper members each interposed between the clutch hub and the disc springs, thus applying a torsional characteristic to the clutch disc, first rivets for fixing the clutch hub and the damper member to each other, and second rivets for fixing the disc spring and the damper member to each other.

The damper member has a plurality of damper plates arranged side by side and including a damper plate to which a lower torque is assigned and another damper plate to which a higher torque is assigned; damper plates to which an intermediate torque and the higher torque are assigned are not fixed to the clutch hub or the disc spring, excluding a damper plate to which the lowest torque is assigned; a stopper pin is installed on an unfixed side of one of the adjacent damper plates to which the intermediate and higher torques are assigned; and a play interval-provided cut-out portion or a play interval-provided engaging hole which engage the stopper pin is formed on the other of the adjacent damper plates.

Only when the angle of torsion of the damper plate at the lower torque-applied side has reached a predetermined one, the stopper pin is brought into contact with an edge of the play interval-provided cut-out portion or that of the play interval-provided engaging hole.

The sixth invention is characterized in that the damper member has a plurality of damper plates, arranged side by side, including a damper plate to which a lower torque is assigned and a damper plate to which a higher torque is assigned. Damper plates to which an intermediate torque and the higher torque are assigned are not fixed to the clutch hub or the disc spring, excluding a damper plate to which the lowest torque is assigned. A stopper pin is installed on an unfixed side of one of adjacent damper plates, and a play interval-provided cut-out portion or a play interval-provided engaging hole which engage the stopper pin is formed on the other of the adjacent damper plates.

Only when the angle of torsion of the damper plate at the lower torque-applied side has reached a predetermined one, the stopper pin is brought into contact with an edge of the play interval-provided cut-out portion or that of the play interval-provided engaging hole.

A clutch disc, according to the seventh invention, constituting a friction clutch comprises a clutch hub connected with an output shaft, a disc spring having a clutch facing mounted on a peripheral side thereof, and a damper member interposed between the clutch hub and the disc spring, thus applying a torsional characteristic to the clutch disc. The damper member has a plurality of damper plates including a damper plate to which a lower torque is assigned and a damper plate to which a higher torque is assigned; and the damper for applying a torsional characteristic to the clutch disc in a lower torque is integral with the disc spring.

The seventh invention is characterized in that the damper member has a plurality of elastically deformable damper plates and that the damper for applying a torsional characteristic to the clutch disc in a lower torque is integral with the disc spring.

The construction of the seventh invention is applicable to the friction clutch of the first through sixth inventions and thus the advantage of the first through sixth inventions can be combined.

Figure 3A:
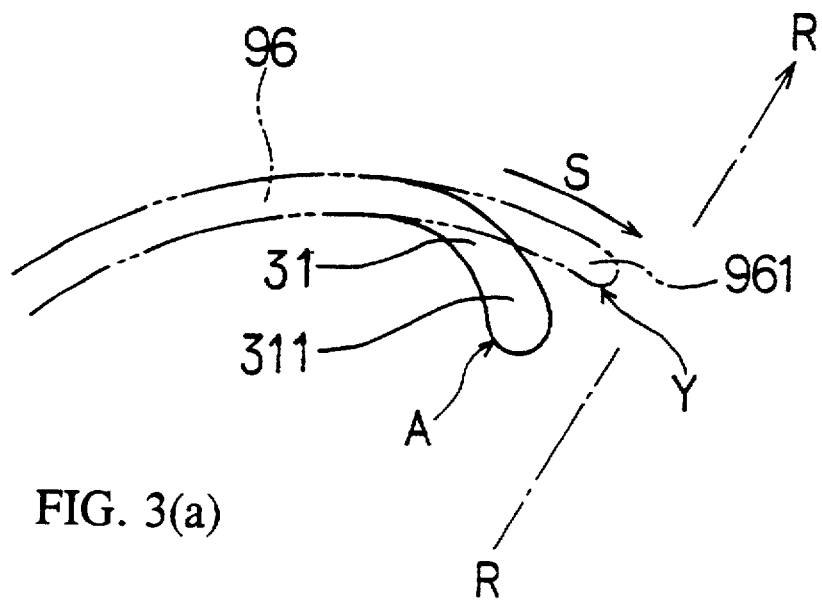
FIGS. 3(a) and 3(b) show the configuration of a slit according to the first example in comparison with that of a conventional slit.
Figure 3B:
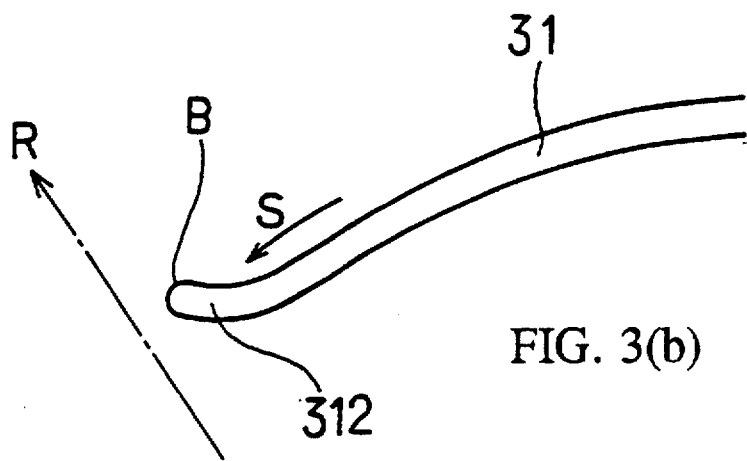

In the clutch disc of the first invention, in the region proximate to the end of the arc-like slit positioned on the damper plate at the peripheral side thereof, the slit is centrifugally curved such that the end of the slit is close to the radius (R) of the concentric circle as shown by a reference numeral 31 of FIG. 3 (b), whereas in the region proximate to the end of the slit positioned at the inner peripheral side of the damper plate, the slit is curved toward the center of the concentric circle such that the end of the slit is close to the radius (R) of the concentric circle as shown by the reference numeral 31 of FIG. 3 (a).

Consequently, a stress (S) generated by a force applied to the damper plate can be prevented from concentrating on the ends of the slit. That is, as can be understood from the fact that the curvatures of the slit at portions (A) and (B) thereof are smaller than that at a portion (Y) thereof, the curvature of the slit at the inner and outer ends thereof along the stress-applied direction is allowed to be small. Therefore, the stress (S) can be prevented from concentrating on the ends of the slit. Consequently, the allowable torque Tm of the damper plate or the maximum angle of torsion $\theta m$ can be increased, with the size (width) of the slit fixed.

As described above, the first invention provides the clutch disc having a superior performance of increasing the allowable torque and the angle of torsion of the damper plate, supposing that the volume and weight thereof is fixed.

The first rivet holes positioned at the inner peripheral side of the damper plate are centrifugally spirally arranged along portions of the slit 31 positioned in proximity to the inner periphery thereof by gradually increasing the distance between the clutch axis (C) and each of the first rivet holes. The radii (r) of the first rivet holes decrease as the distance between the clutch axis (C) and each thereof decreases, whereas the radii (r) thereof increase as the distance between the clutch axis (C) and each thereof increases.

Consequently, the slit 31 of the second invention is allowed to be longer than the slit of the conventional damper plate by a distance $\Delta L$ and an angle $\Delta\theta$, supposing that the radius r0 of the inner circumference of the damper plate is equal to that of the inner circumference of the conventional damper plate. Thus, the plates interposed between adjacent slits are allowed to be longer than the conventional ones and hence the damper plate of the second invention has a greater maximum angle of torsion $\theta m$ than the conventional one.

Figure 4:
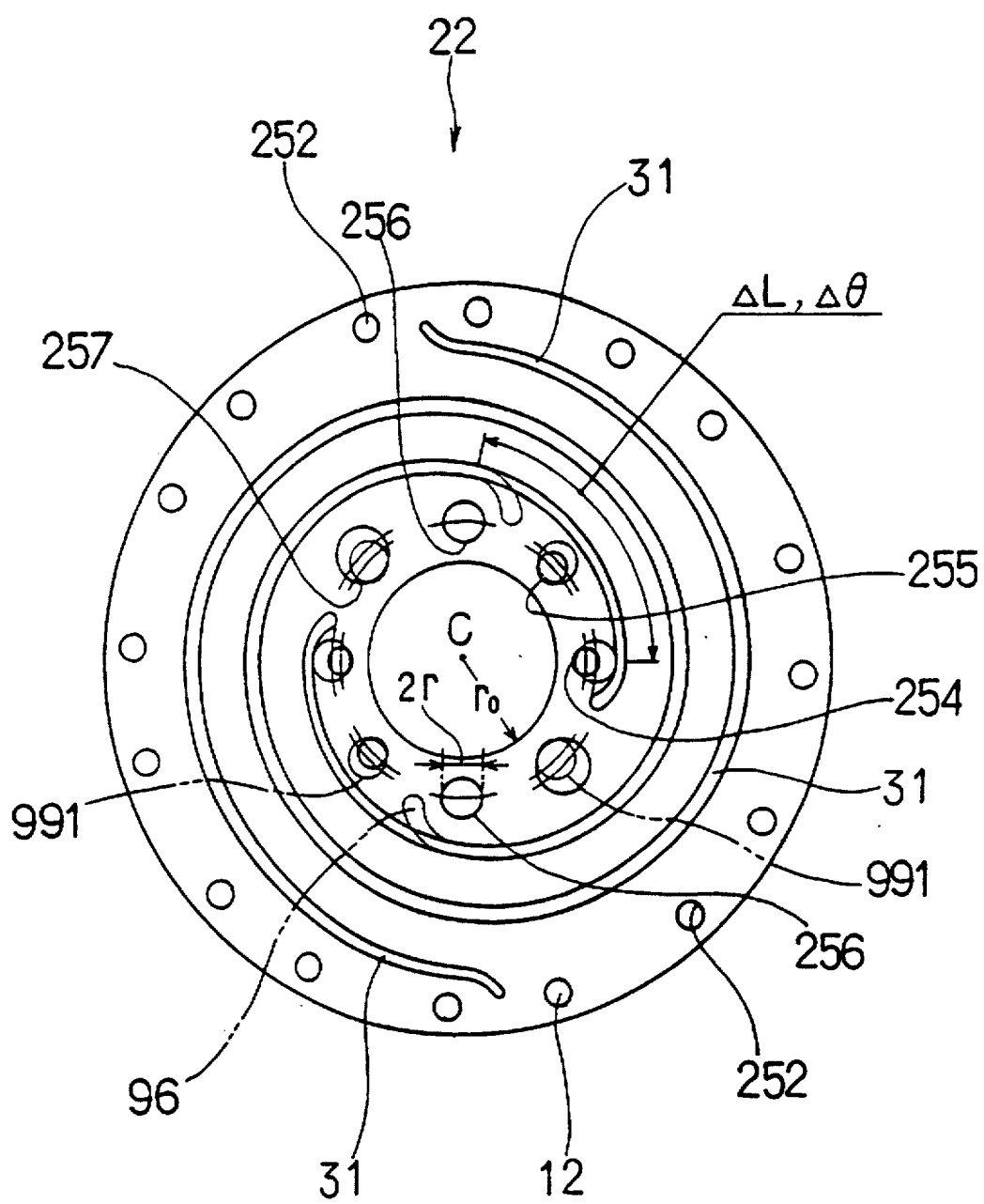
FIG. 4 is a front view showing a damper plate according to a second example.

That is, if the radii of the rivet holes are equal to each other as in the case of the conventional damper plate and if the rivet holes are arranged on a concentric circle and symmetrically with respect to the center of the concentric circle, the rivet holes are as shown by two-dot chain lines and by reference numerals 991 of FIG. 4. This construction prevents plates positioned between adjacent slits from having an area necessary for securing the strength of the damper plate, thus causing the width of the slit 96 to be long and length thereof to be short. $\Delta L$ and $\Delta\theta$ shown in FIG. 4 indicate a decreased length of the slit 96 and a reduced angle of torsion of the conventional damper plate.

As described above, the second example provides the clutch disc applicable to an allowable torque higher than that of the conventional clutch disc and having an angle of torsion greater than that of the conventional one, supposing that the volume and weight thereof is equal to those of the conventional clutch disc.

The damper member of the clutch disc according to the third invention has at least one elastically deformable damper plate. The damper plate is formed of an annular deformable material, a surface of which is perpendicular to a clutch axis and has a plurality of arc-like cut lines or a plurality of arc-like slits formed thereon in a range from an inner peripheral side of the annulus toward a peripheral side thereof such that there is a dislocation between the inner periphery of the annulus and the periphery thereof in a direction parallel with the clutch axis to cause adjacent structures centrifugally spirally formed by the presence of the arc-like cut lines or the arc-like slits to be dislocated from each other in the axial direction of the clutch axis, so that when the adjacent structures are dislocated radially from each other as a result of circumferential twists applied thereto, the arc-like cut lines or the arc-like slits do not interfere with each other. The structures are formed of an elastically deformable material, respectively.

Figure 6:
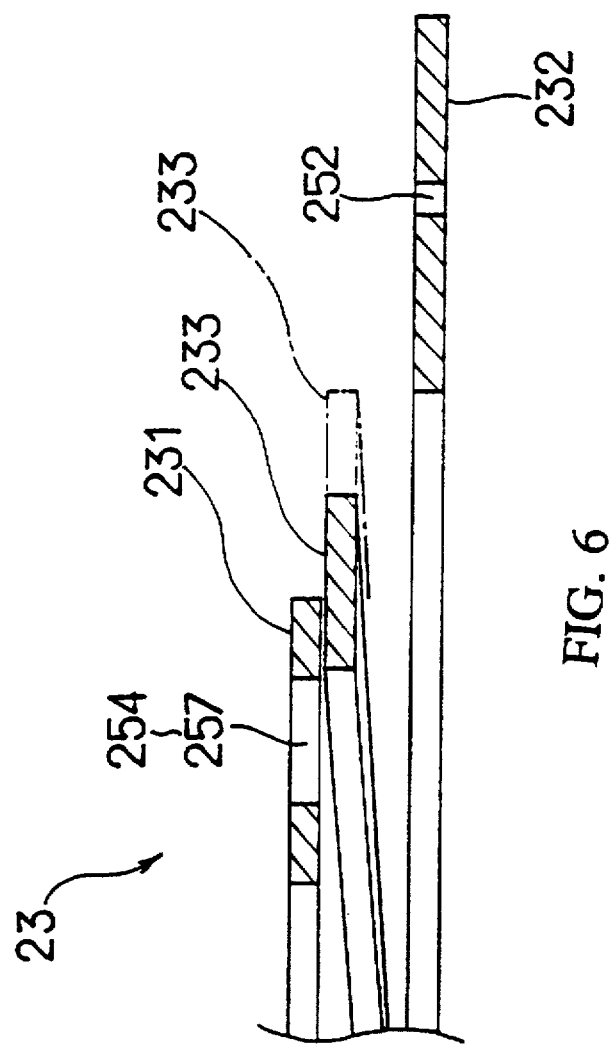
FIG. 6 is a sectional view showing main portions in an enlarged side elevational view showing how the state of the damper plate has been changed from the state shown in FIG. 5(b) when torsion is applied thereto)

Because there is a dislocation between the inner periphery of the damper plate and the periphery thereof in a direction parallel with the clutch axis to form a thickness in the axial direction of the damper member, adjacent damper plates can be prevented from interfering with each other in the movements thereof in the radial direction thereof as shown in FIG. 6 when the damper plates are twisted, even though a slit having a small width is formed. Thus, the damper plates are allowed to have an increased width and length as the slit width is reduced, and hence, the allowable torque and/or the angle of torsion can be increased.

Consequently, the allowable torque Tm of the damper plate can be increased in correspondence to the reduction in the slit width, by increasing the width of the damper plate, with the size (radius) of the damper plate fixed to a certain one, and the length of the damper plate can be increased in correspondence to the reduction in the slit width, with the width of the damper plate fixed to a certain one. Consequently, the angle of torsion $\theta m$ of the damper plate can be increased, with the allowable torque Tm fixed to a certain one.

As described above, the third example provides the clutch disc applicable to an allowable torque greater than that of the conventional clutch disc and having an angle of torsion greater than that of the conventional one, supposing that the volume and weight thereof is equal to those of the conventional clutch disc.

In the clutch disc of the fourth invention, the damper member has at least one elastically deformable damper plate, and the damper plate is formed of an annular elastic material, a surface of which is perpendicular to a clutch axis and has a plurality of arc-like slits formed thereon centrifugally spirally in a range from an inner peripheral side of the annulus toward a peripheral side thereof such that the damper plate has long and narrow plates formed between the adjacent arc-like cut lines or between the adjacent arc-like slits by inclining the long and narrow plates with respect to a horizontal plane perpendicular to the clutch axis so as to axially space from each other faces of the long and narrow plates formed by the presence of the arc-like cut lines or the arc-like slits by more than the thicknesses of the long and narrow plates. The structures comprising the long and narrow plates are formed of an elastically deformable material.

Figure 7A:
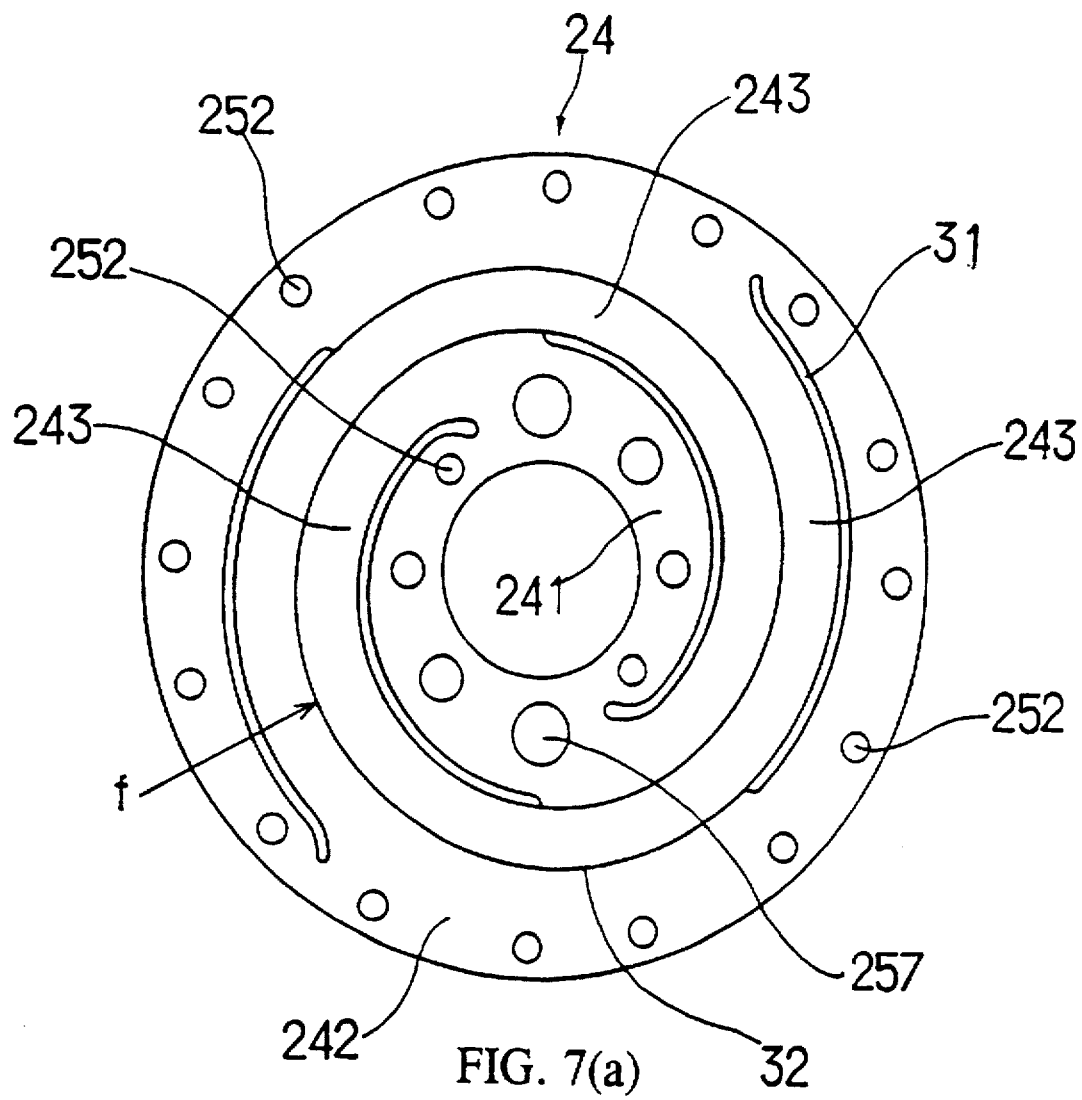
FIG. 7 (a) is a front view showing a damper plate according to a fourth example, and FIG. 7 (b) is a left side sectional view showing the clutch disc according to the fourth example.
Figure 7B:
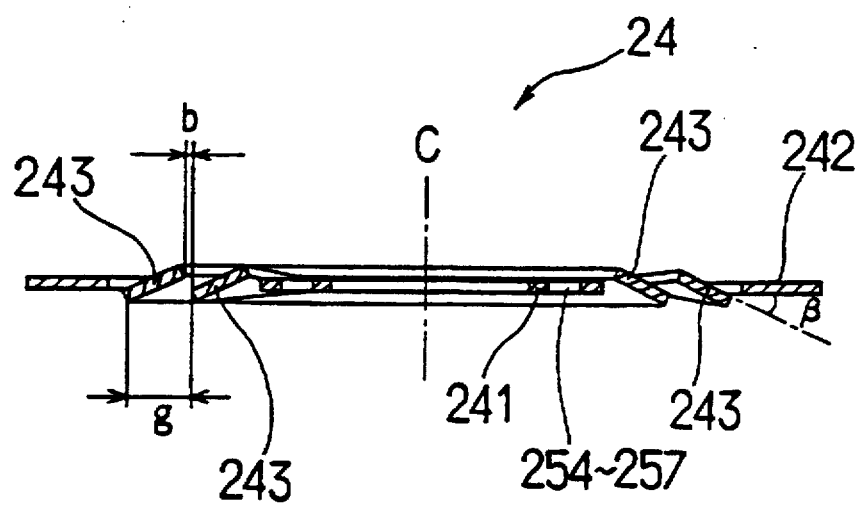

According to the above construction, similarly to the third invention, as shown in FIG. 7 (b), the long and narrow plates are inclined with a plane perpendicular to the clutch axis to generate an interval (g) between the adjacent long and narrow plates. In this manner, even though the width (b) of the slit is reduced, the movable region of the long and narrow plates in the radial direction can be increased to the interval (g).

Consequently, the maximum angle of torsion $\theta m$ of the damper plate can be increased, with the size (diameter) thereof and the allowable torque Tm fixed to a certain one.

As described above, the fourth example provides the clutch disc applicable to an allowable torque greater than that of the conventional clutch disc and having an angle of torsion greater than that of the conventional one, supposing that the volume and weight thereof is equal to those of the conventional clutch disc.

In the clutch disc of the fifth invention, the stopper plate has a plurality of play interval-provided cut-out portions or a plurality of play interval-provided engaging holes. When the angle of torsion of the damper plate is zero, there is an interval, greater than a predetermined one, between each of the first rivets and an edge of each of the play interval-provided cut-out portions or the play interval-provided engaging holes. When the angle of torsion of the damper plate has reached a predetermined value $\theta m$, the edge of each of the play interval-provided cut-out portions or the play interval-provided engaging holes is brought into contact with each of the first rivets.

Consequently, when the angle of torsion of the damper plate has reached the maximum value θm, each first rivet is brought into contact with the edge of the corresponding engaging hole of the stopper plate. Thus, a torque higher than the allowable maximum torque Tm corresponding to the maximum angle of torsion θm is applied to the stopper plate. That is, the highest torque to be applied to the damper plate is the allowable maximum torque Tm.

Accordingly, the damper plate is not required to have a strength to cope with excessive force to be applied thereto. Thus, the damper plate can be allowed to be compact and light.

As described above, the fifth example provides the clutch disc applicable to an allowable torque greater than that of the conventional clutch disc and having an angle of torsion greater than that of the conventional one, supposing that the volume and weight thereof is equal to those of the conventional clutch disc.

In the clutch disc of the sixth invention, the damper member has a plurality of damper plates arranged side by side and including a damper plate for a lower torque and another damper plate for a higher torque is assigned. The damper plates to which an intermediate torque and the higher torque are assigned are not fixed to the clutch hub or the disc spring, excluding a damper plate for the lowest torque. The stopper pin is installed on an unfixed side of one of adjacent damper plates, and a play interval-provided cut-out portion or a play interval-provided engaging hole which engage the stopper pin is formed on the other of the adjacent damper plates.

Figure 13:
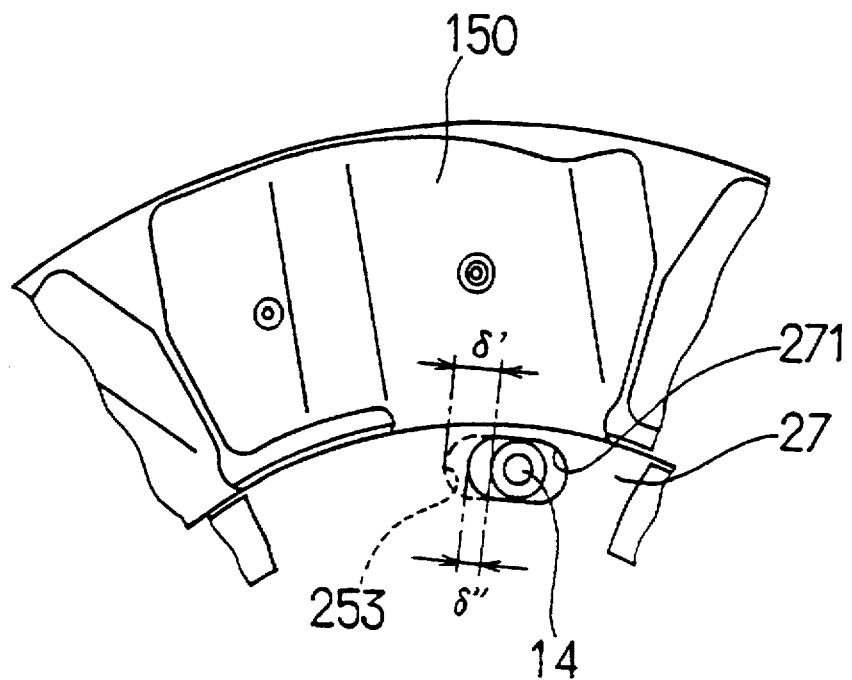
FIG. 13 is a view showing the interval between engaging holes of a stopper plate according to the sixth example and a corresponding second rivet.
Figure 14:
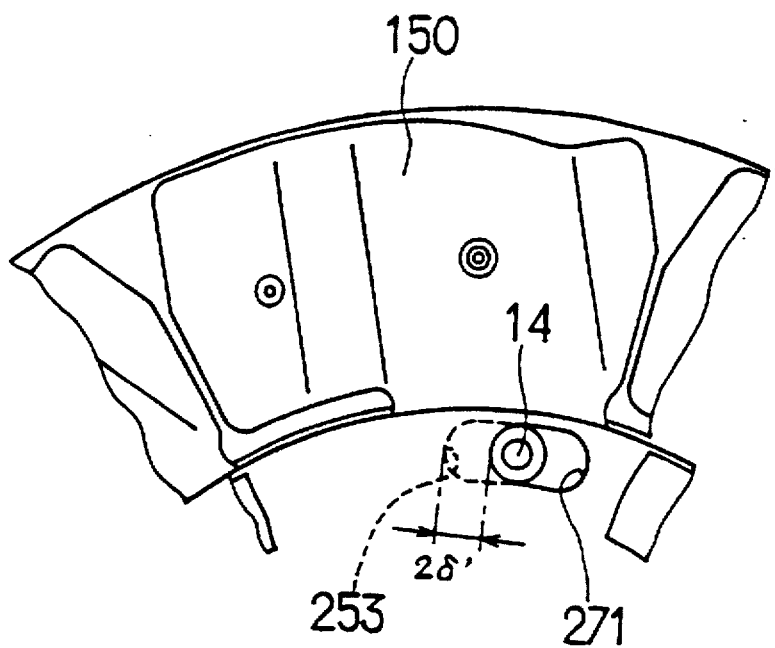
FIG. 14 is a view showing the interval between engaging holes of a stopper plate according to the sixth example and a corresponding second rivet.

That is, when a low torque (when the angle of torsion of one damper plate is zero) is applied to the clutch disc, there is a gap δ" between the edge of the play interval-provided engaging hole 271 (or play interval-provided cut-out portion) of the other damper plate and the stopper pin, as shown in FIG. 13, and a torsional torque is not applied to the other damper plate through the stopper pin. At this time, a torque is increasingly applied to one damper plate. As a result, when one damper plate is twisted by the gap δ" as shown in FIG. 14, a torsional force is applied to the other damper plate.

Only when a torsion higher than a predetermined value is generated on one damper plate (previous stage) which operates in a low torque, the other damper plate (subsequent stage) which operates in a high torque is twisted. In this manner, the torsional characteristics of the damper plates are sequentially added to each other and consequently, the clutch disc is allowed to have a high allowable torque and a great angle of torsions m and have a multi-stage torsional characteristic as shown in FIG. 15.

Figure 15:
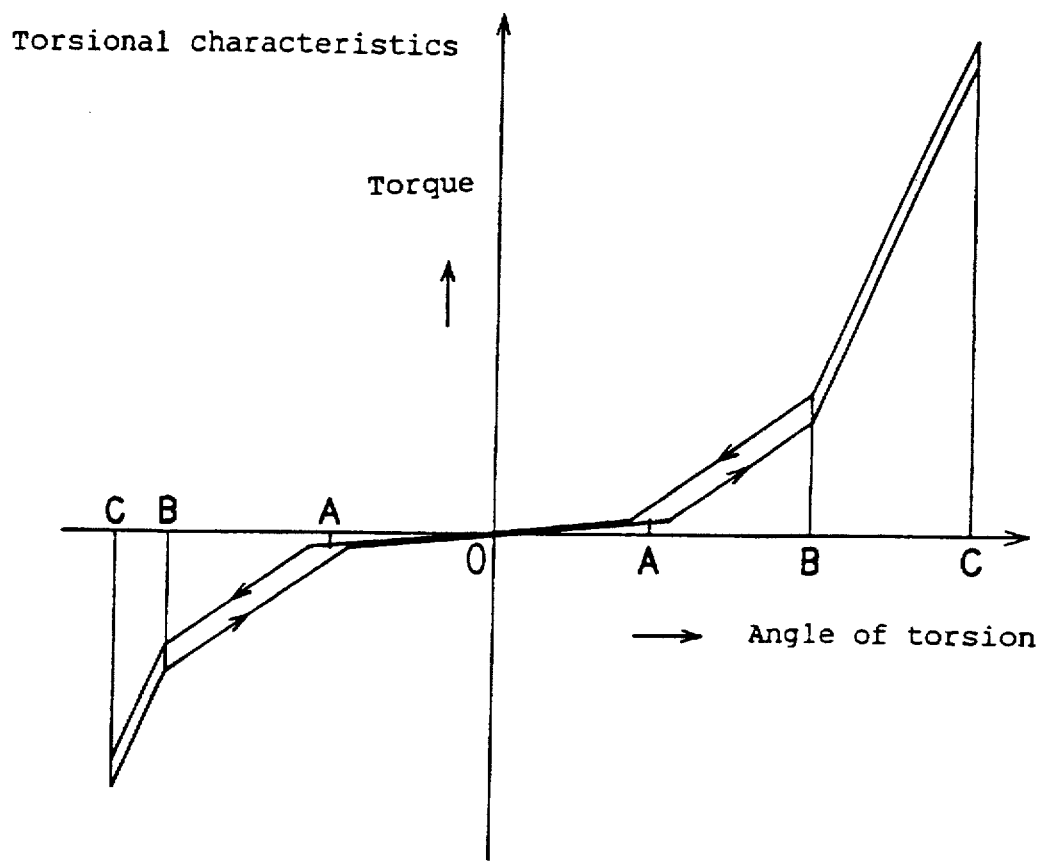
FIG. 15 is a view showing the torsional characteristic of a damper member of the sixth example.

In this manner, the present invention provides a clutch disc having a three-stage torsional characteristic of a high allowable torque and a great angle of torsion, as shown by the lines of 0-A, A-B, and B-C shown in FIG. 15. In the clutch disc according to the seventh invention, the damper member has a plurality of elastically deformable damper plates and that the damper for applying a torsional characteristic to the clutch disc in a lower torque is integral with the disc spring.

That is, if the damper plate generating a torsional characteristic in a low torque region and the disc spring are integral with each other and if the clutch disc requires a hysteresis characteristic and thus the friction member is provided, no friction is generated between the damper plate which operates in a low torque and the disc spring. Accordingly, the clutch disc of the seventh invention eliminates an unnecessary hysteresis in a low torque region.

As described above, the constructions of the respective inventions may be appropriately combined with each other.

EXAMPLES (First Example)

The first example relates to a clutch disc according to the first invention.

Figure 2:
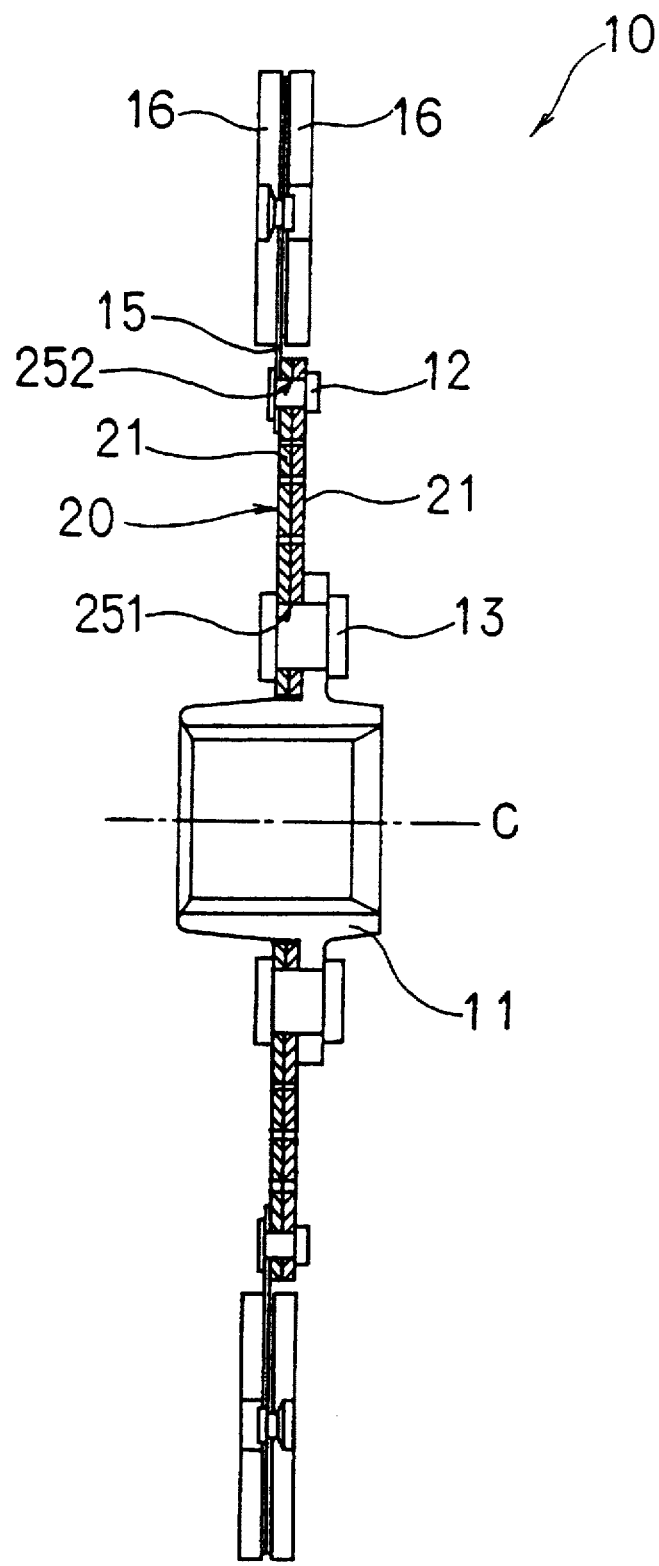
FIG. 2 is a left side sectional view showing the clutch disc according to the first example.

As shown in FIG. 2, a clutch disc 10 constituting a friction clutch comprises a clutch hub 11 connected with an output shaft, a disc spring 15 having a clutch facing 16 mounted on the periphery thereof, and a damper member 20 interposed between the clutch hub 11 and the disc spring 15, thus applying a torsional characteristic to the clutch disc 10.

The damper member 20 has at least one damper plate 21 elastically deformable. As shown in FIG. 1, the damper plate 21 is formed of an annular elastic material, the surface of which is perpendicular to a clutch axis (C) and has a plurality of arc-like slits 31 formed thereon centrifugally spirally in a range from the vicinity of the inner periphery thereof toward the vicinity of the periphery thereof.

As shown in FIG. 3 (b), in a portion proximate to the end of each slit 31 at the peripheral side of the damper plate 21, the slit 31 is centrifugally curved such that the end thereof is close to a radius of a concentric circle, whereas as shown in FIG. 3 (a), in a portion proximate to the end of the slit 31 at the inner peripheral side of the damper plate 21, the slit 31 is curved toward the center of a concentric circle such that the end thereof is close to a radius of the concentric circle.

The damper plate 21 has a plurality of first rivet holes 251 formed in proximity to the inner periphery thereof and a plurality of second rivet holes 252 formed in proximity to the periphery thereof. Rivets 13 for fixing the damper plate 21 to the clutch hub 11 are inserted through the first rivet holes 251. Rivets 12 (see FIG. 2) for fixing the damper plate 21 to the disc spring 15 are inserted through the second rivet holes 252. The first and second rivet holes 251 and 252 are formed at regular intervals concentrically, respectively. As shown in FIG. 3, a portion of the slit 31 proximate to the inner end 311 thereof is curved to be close to the radius, of the concentric circle, positioned approximately intermediate between the adjacent first rivet holes 251 and 251, whereas a portion of the slit 31 proximate to the outer end 312 thereof is curved to be close to the radius, of the concentric circle, positioned approximately intermediate between the adjacent second rivet holes 252 and 252.

Reference numerals 418 and 419 shown in FIG. 1 denote rivet facings for fixing the disc spring 15 and the clutch facing 16, repectively.

As described above, in the clutch disc 10 of the first embodiment, in the portion proximate to the end 312 of the arc-like slit 31 at the peripheral side of the damper plate 21, the slit 31 is centrifugally curved such that the end 312 of the slit 31 is close to the radius of the concentric circle, as shown in FIG. 3 (b), whereas in the portion proximate to the end 311 of the slit 31 at the inner peripheral side of the damper plate 21, the slit 31 is curved toward the center of the concentric circle such that the end 311 of the slit 31 is close to the radius of the concentric circle as shown in FIG. 3 (a).

Consequently, a stress (S) generated by a force applied to the damper plate 21 can be prevented from concentrating on a portion (A) of the slit 31. That is, because the ends 311 and 312 of the slit 31 are curved, the portions (A) and (B) are located at positions to which the stress (S) is applied to a small extent. Thus, the extent of the concentration of the stress (S) to be generated on each of the portions (A) and (B) is much lower than that of the stress (S) to be generated to the maximum on the end 961 of the conventional slit 96. Consequently, the allowable torque Tm of the damper plate 21 can be increased, with the size (width) (angle of torsion) of the slit 31 fixed or the maximum angle of torsion θm of the damper plate 21 can be increased, with the allowable torque Tm fixed (the second problem previously described can be solved by the second example.)

As described above, the first example provides the clutch disc applicable to an allowable torque greater than that of the conventional clutch disc and having an angle of torsion greater than that of the conventional one, supposing that the volume and weight thereof is equal to those of the conventional clutch disc.

(Second Example)

The second example relates to a clutch disc according to the second invention.

That is, as shown in FIG. 4, a damper plate 22 of the second example has a plurality of first rivets (not shown) and a plurality of first rivet holes 254 through 257 centrifugally spirally arranged along portions of an arc-like slit 31 positioned in proximity to the inner periphery thereof by gradually increasing the distance between the clutch axis (C) and each of the first rivet holes 254 through 257. The radii (r) of the first rivet holes 254 through 257 gradually decrease as the distance between the clutch axis (C) and each thereof decreases, whereas the radii (r) thereof increase gradually as the distance between the clutch axis (C) and each thereof increases.

That is, as shown by two-dot chain lines in FIG. 4, the radii (r) of the rivet holes 991 of the conventional damper plate 95 are equal to each other, and the rivet holes 991 are formed at regular intervals, whereas the radii (r) of the first rivet holes 254 through 257 of the second example gradually increase in the order from the first rivet hole 254 to the first rivet hole 257, and the distance between the clutch axis (C) and each of the first rivet hole 254 through the first rivet hole 257 gradually increases as the radii (r) thereof increase.

Consequently, the slit 31 of the damper plate 22 according to the second example is longer than the slit 96 of the conventional damper plate 95. Thus, the distance between the inner end of the slit 31 and the clutch axis (C) is longer than that between the inner end of the slit 96 of the conventional damper plate 95 and the clutch axis (C). ΔL and Δθ shown in FIG. 4 indicate an increased length of the slit 31 of the second example and an increased angle of torsion of the damper plate 22 relative to the length of the slit 96 and the angle of torsion of the conventional damper plate 95, respectively. Therefore, the damper plate 22 has a greater angle of torsion θm than the conventional damper plate 95 (the third problem can be solved by the third example.)

Other constructions and operations of the second example are similar to those of the first example.

As described above, the second example provides the clutch disc applicable to an allowable torque greater than that of the conventional clutch disc and having an angle of torsion greater than that of the conventional one, supposing that the volume and weight thereof is equal to those of the conventional clutch disc.

(Third Example)

The third example relates to a clutch disc according to the third invention.

Figure 5A:
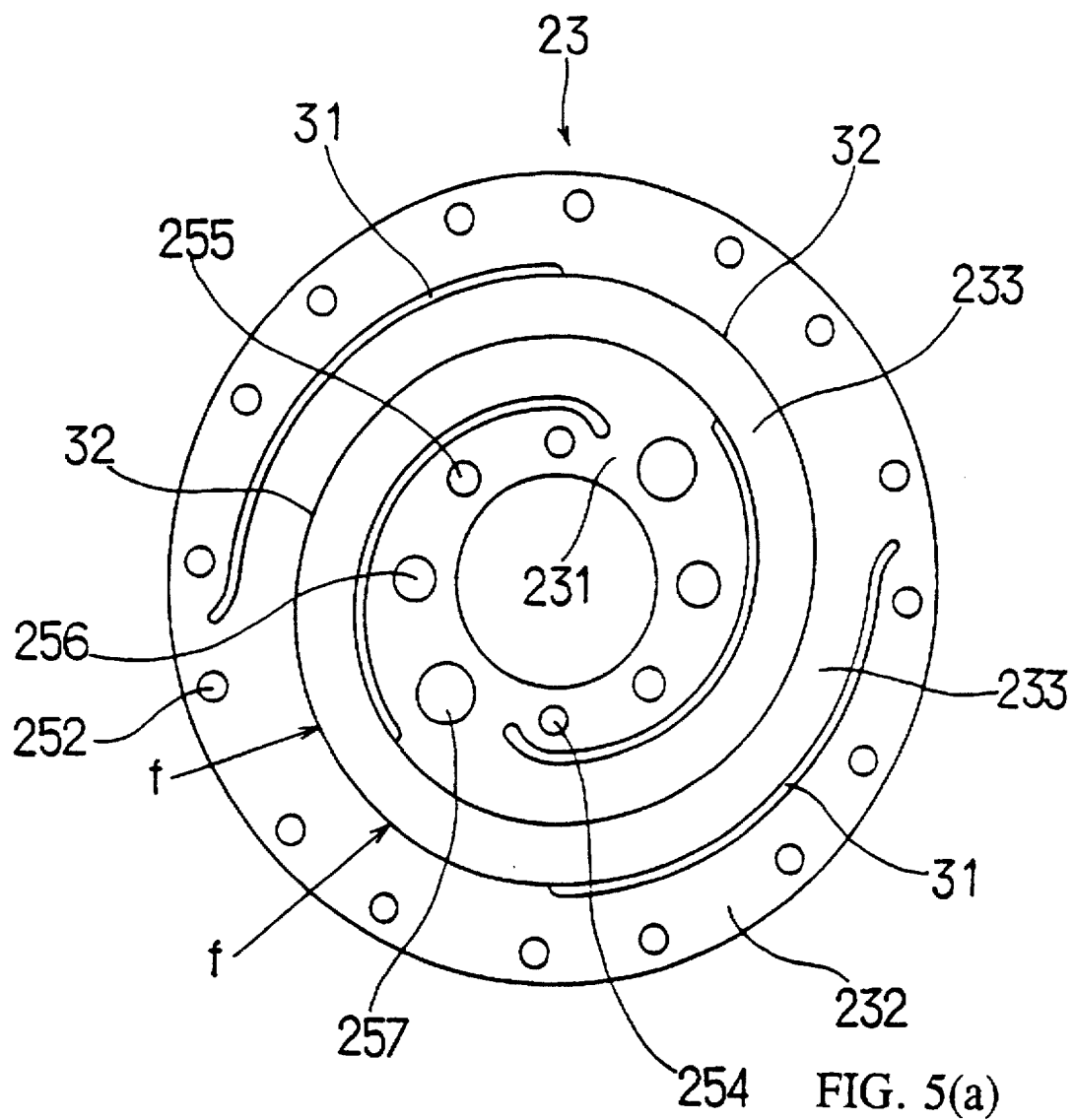
FIG. 5 (a) is a front view showing a damper plate according to a third example, and FIG. 5 (b) is a left side sectional view showing the clutch disc according to the third example.
Figure 5B:
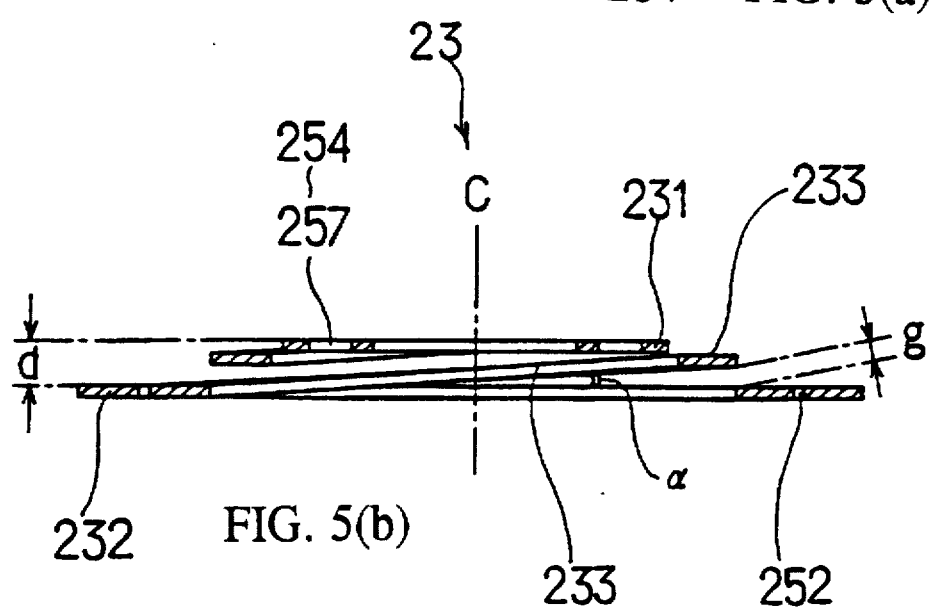

That is, as shown in FIGS. 5 (a) and 5 (b), the damper plate 23 is formed of an annular deformable material, the surface of which is perpendicular to the clutch axis (C) and has a plurality of arc-like cut lines 32 and a plurality of arc-like slits 31 formed thereon centrifugally spirally in the range from a position proximate to the inner periphery thereof toward a position proximate to the periphery thereof. There is a dislocation (d) between the inner periphery of the damper plate 23 and the periphery thereof in the direction parallel with the clutch axis (C) so that the damper plate 23 has a certain thickness in the axial direction thereof. Consequently, the cut line 32 and the slit 31 are allowed to have an increased width in the vertical direction thereof. The damper plate 23 is made of a material such as a spring steel plate elastically deformable.

As shown in FIG. 5 (b), there is the dislocation (d) between an inner plate 231 positioned at the inner peripheral side of the damper plate 23 and an outer plate 232 positioned at the peripheral side thereof, as described above. The inner plate 231 and the outer plate 232 both fixed to the clutch hub by the rivets have surfaces perpendicular to the clutch axis (C). The dislocation (d) causes a plate 233 positioned intermediate between the inner plate 231 and the outer plate 232 to be inclined by a slight angle a and vertically spiral along the clutch axis (C).

Because there is the dislocation (d) between the upper surface and the lower surface in the damper plate 23, the width of the slit 31 and that of the cut line 32 can be increased vertically, with the sum of the area of the plates 231 through 233 of the damper plate 23 fixed to a certain one. That is, there is little gap (for example, arrow f) in the slit 31 and the cut line 32 as shown in FIG. 5 (a) which is a plan view showing the damper plate 23, whereas they have a gap (g) in the axial direction of the clutch disc 23 when taking a side-view of the damper plate 23, as shown in FIG. 5 (b) which is a side sectional view showing the damper plate 23.

Upon applying a torsional torque to the damper plate 23, as shown in FIG. 6, the plate 233 positioned intermediate between the inner plate 231 and the outer plate 232 is deformed from a position shown by one-dot chain to a position shown by a solid line, namely, toward the clutch axis (C).

Consequently, the maximum angle of torsion θm of the damper plate 23 can be increased, with the size (diameter) thereof and the allowable torque Tm thereof fixed (the first problem can be solved by the second example.)

Other constructions and operations of the third example are similar to those of the second example.

As described above, the third example provides the clutch disc applicable to an allowable torque greater than that of the conventional clutch disc and having an angle of torsion greater than that of the conventional one, supposing that the volume and weight thereof is equal to those of the conventional clutch disc.

(Fourth Example)

The fourth example relates to a clutch disc according to the fourth invention.

That is, as shown in FIGS. 7 (a) and 7 (b), a damper plate 24 of the fourth example is formed of an annular deformable plate, the surface of which is perpendicular to the clutch axis (C) and has a plurality of arc-like cut lines 32 or arc-like slits 31 formed thereon centrifugally spirally from a position proximate to the inner periphery thereof toward a position proximate to the periphery thereof. Further, the damper plate 24 has long and narrow plates 243 formed between the adjacent cut lines 32 and 32 or between the adjacent slits 31 and 31 by forming a certain angle between the plates 243 and a horizontal plane perpendicular to the clutch axis (C). Thus, the cut line 32 and the slit 31 are allowed to have a large vertical width (gap). The damper plate 24 is made of a material such as a spring steel plate elastically deformable.

The inclined plate 243 inclined by an angle β with a horizontal plane perpendicular to the clutch axis (C) is provided between an inner plate 241 positioned at the inner peripheral side of the damper plate 24 and an outer plate 142 positioned at the peripheral side thereof, as shown in FIG. 7 (b). That is, each of the inner plate 241 fixed at the inner peripheral side of the damper plate 24 by the rivet and the outer plate 142 fixed at the peripheral side thereof by the rivet has a surface perpendicular to the clutch axis (C), whereas the inclined plate 243 interposed therebetween has an inclination β.

The damper plate 24 having a certain thickness allows the width (g) of the slit 31 and that of the cut line 32 to be increased vertically, with the sum of the area of the plates 241 through 243 of the damper plate 24 fixed to a certain one. That is, there is little gap (for example, arrow f) in the slit 31 and the cut line 32 as shown in FIG. 7 (a) which is a plan view showing the damper plate 24, whereas they have the gap (g) in the axial direction of the clutch disc 24 when taking a side-view of the damper plate 24, as shown in FIG. 7 (b) which is a side sectional view showing the damper plate 24. Upon applying a torsional torque to the damper plate 24, the plate 243 is radially moved by the gap (g).

Consequently, the maximum angle of torsion θm of the damper plate 24 can be increased, with the size (diameter) thereof and the allowable torque Tm thereof fixed (the first problem can be solved by the second example.)

Other constructions and operations of the third example are similar to those of the second example.

As described above, the fourth example provides the clutch disc applicable to an allowable torque greater than that of the conventional clutch disc and having an angle of torsion greater than that of the conventional one, supposing that the volume and weight thereof is equal to those of the conventional clutch disc.

(Fifth Example)

The fifth example relates to a clutch disc according to the fifth invention.

Figure 8:
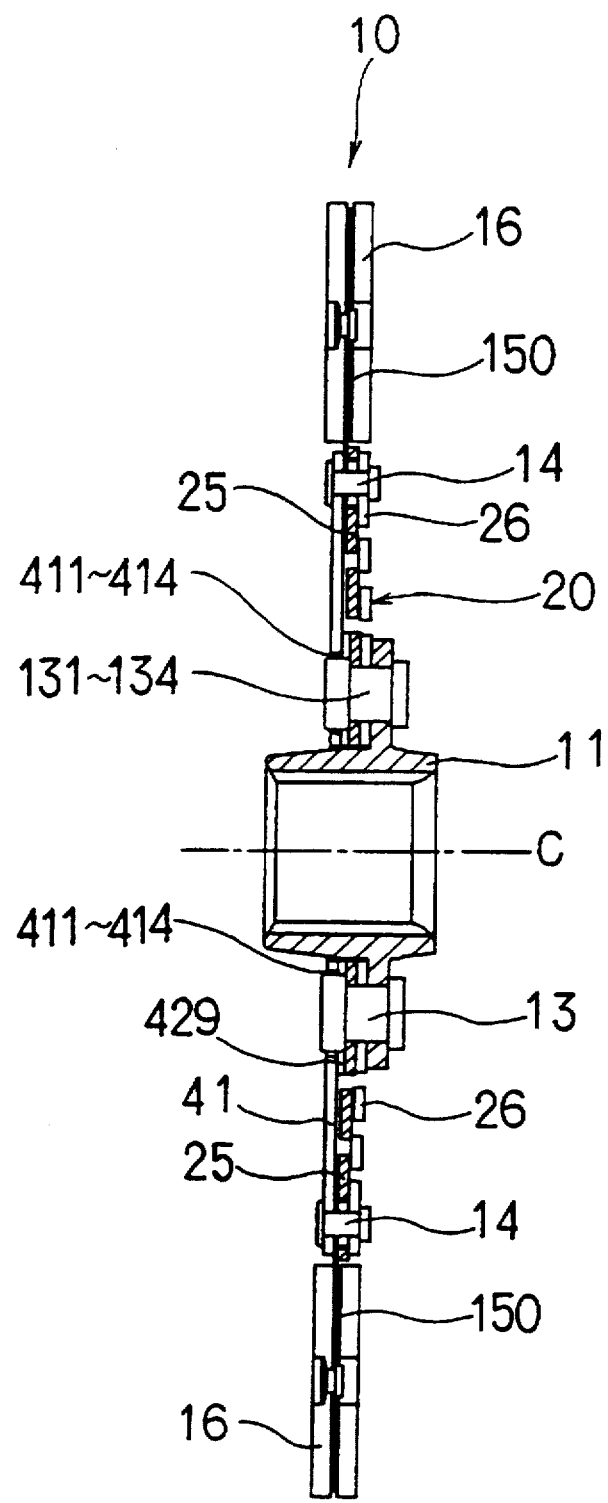
FIG. 8 is a side sectional view showing a clutch disc according to a fifth example.
Figure 9:
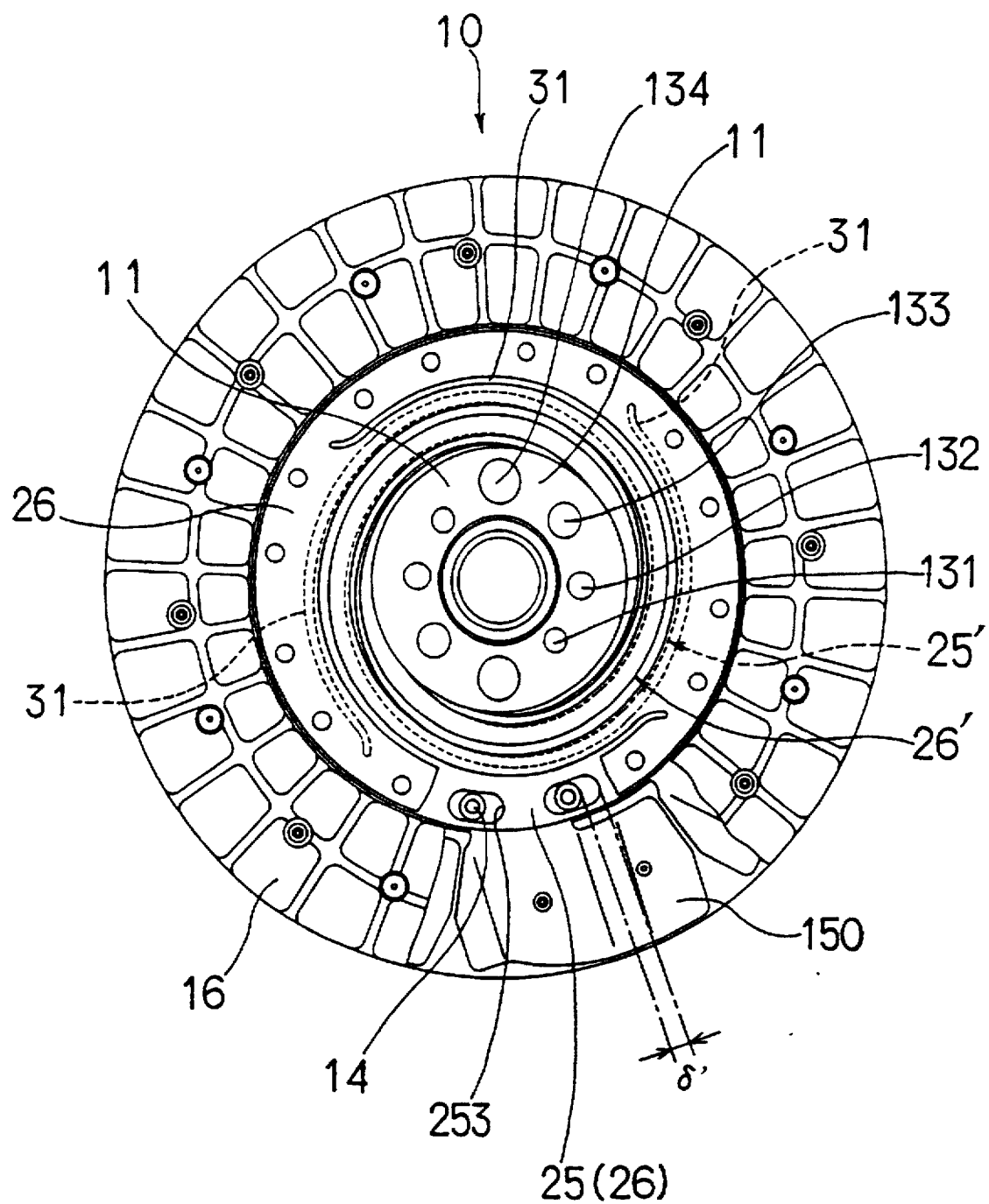
FIG. 9 is a view in which a right front portion of the clutch disc of a fifth example is cut away.

As shown in FIGS. 8 and 9, a clutch disc 10 constituting a friction clutch comprises a clutch hub 11 connected with an output shaft, disc springs 150 each having a clutch facing 16 mounted on the periphery thereof, and damper members 20 each interposed between the clutch hub 11 and the each spring 150, thus applying a torsional characteristic to the clutch disc 10, stopper plates 41 fixed to each disc spring 150 and each damper member 20, first rivets 131 through 134 for fixing the clutch hub 11 and the damper member 20 to each other, and second rivets 14 for fixing the disc spring 150 and the damper member 20 to each other. Reference numeral 429 shown in FIG. 8 denotes a thrust lining interposed between the stopper plate 41 and a damper plate 25.

The damper member 20 comprises the damper plate 25 and a damper plate 26 arranged symmetrically by inverting one by 180° with respect to the other and having elastically deformable materials 25' and 26', respectively. The elastically deformable material 25' (shown by broken line in FIG. 9) of the damper plate 25 is set to be wider and shorter than the elastically deformable material 26' (shown by solid line in FIG. 9) of the damper plate 26, thus operating in response to a high torque applied to the clutch disc.

Because of the width and the length of the damper plates 25 and 26 set as described above, the damper plate 25 is capable of withstanding a high torque applied thereto, but has a smaller allowable angle of torsion than the damper plate 26. In consideration of this construction, as shown in FIG. 9, a play interval δ' is formed on an engaging hole 253, through which the second rivet 14 is inserted, formed on the damper plate 25 so as to make the angle of torsion of the damper plate 25 smaller than that of the damper plate 26 by the play interval d'. That is, when a low torque is applied to the clutch disc, only the damper plate 26 is twisted and as a result, the second rivet 14 fixed to the periphery of the damper plate 26 moves by the play interval d', thus twisting the damper plate 25 together with the damper plate 26. a torsional characteristic of the clutch disc obtained in the fifth example is as shown by a line in the interval between 0 and B in FIG. 15.

Figure 10:
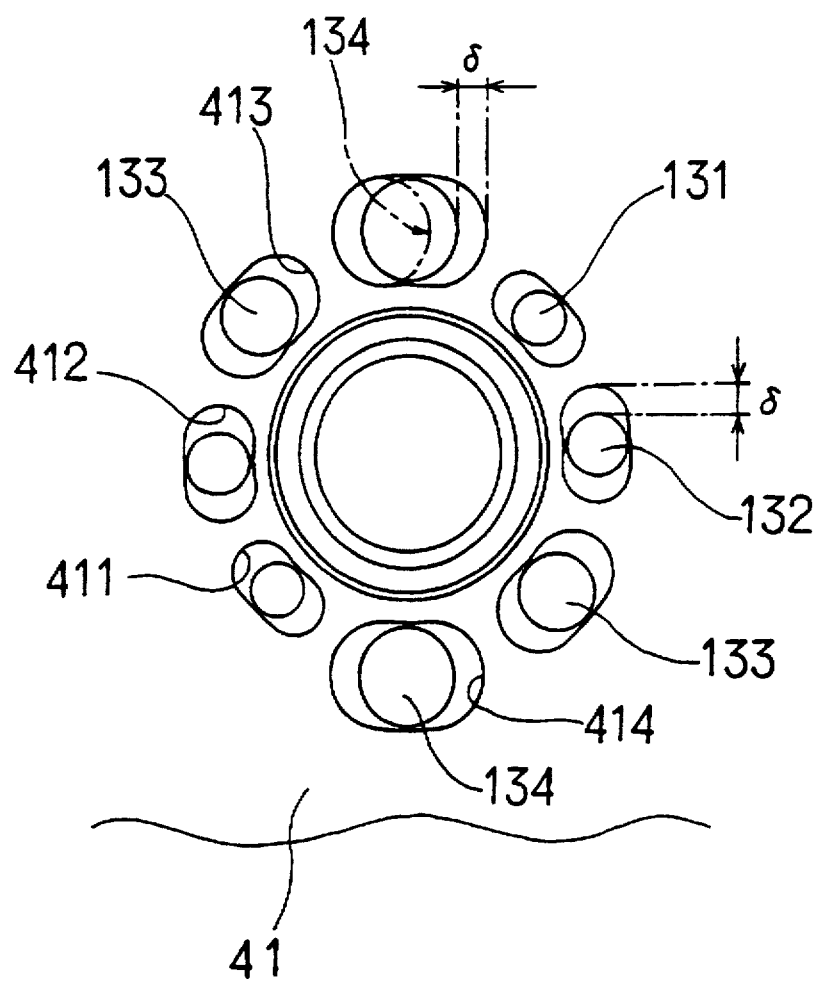
FIG. 10 is a view showing the interval between engaging holes of a stopper plate according to the fifth example and a corresponding first rivet.

The clutch disc 10 of the fifth example has the stopper plate 41, the periphery of which is fixed to the damper plate 26. The stopper plate 41 has in the inner periphery thereof engaging holes 411 through 414 each provided with a play interval as shown in FIG. 10. When the angle of torsion of the damper plate 25 and that of the damper plate 26 are 0, there is an interval δ, greater than a predetermined one, between each of the first rivets 131 through 134 and an edge of each of the engaging holes 411 through 414. When the angle of torsion of the damper plate 25 and that of the clutch disc 26 have reached a predetermined one θm, the edge of each of the engaging holes 411 through 414 is brought into contact with each of the first rivets 131 through 134.

Consequently, when the angle of torsion of the damper plate 25 and that of the damper plate 26 have reached the maximum one θm and θm', respectively, the first rivets 131 through 134 are brought into contact with the edge of the engaging holes 411 through 414 of the stopper plate 41, respectively. A torque higher than the allowable maximum torque Tm corresponding to the maximum angle of torsion θm and θm' is not applied to the damper plates 25 and 26 but to the stopper plate 41 through the first rivets 131 through 134. That is, the highest torque to be applied to the damper plates 25 and 26 is the allowable maximum torque Tm.

Accordingly, the damper plates 25 and 26 are not required to cope with a possible excessive force generated by the clutch disc 10. Thus, the damper plates 25 and 26 can be allowed to be compact and light.

As described above, the fifth example provides the clutch disc applicable to an allowable torque greater than that of the conventional clutch disc and having an angle of torsion greater than that of the conventional one, supposing that the volume and weight thereof is equal to those of the conventional clutch disc.

(Sixth Example)

In the sixth example, the clutch disc has a three-stage torsional characteristic, as shown in FIG. 15.

Figure 11:
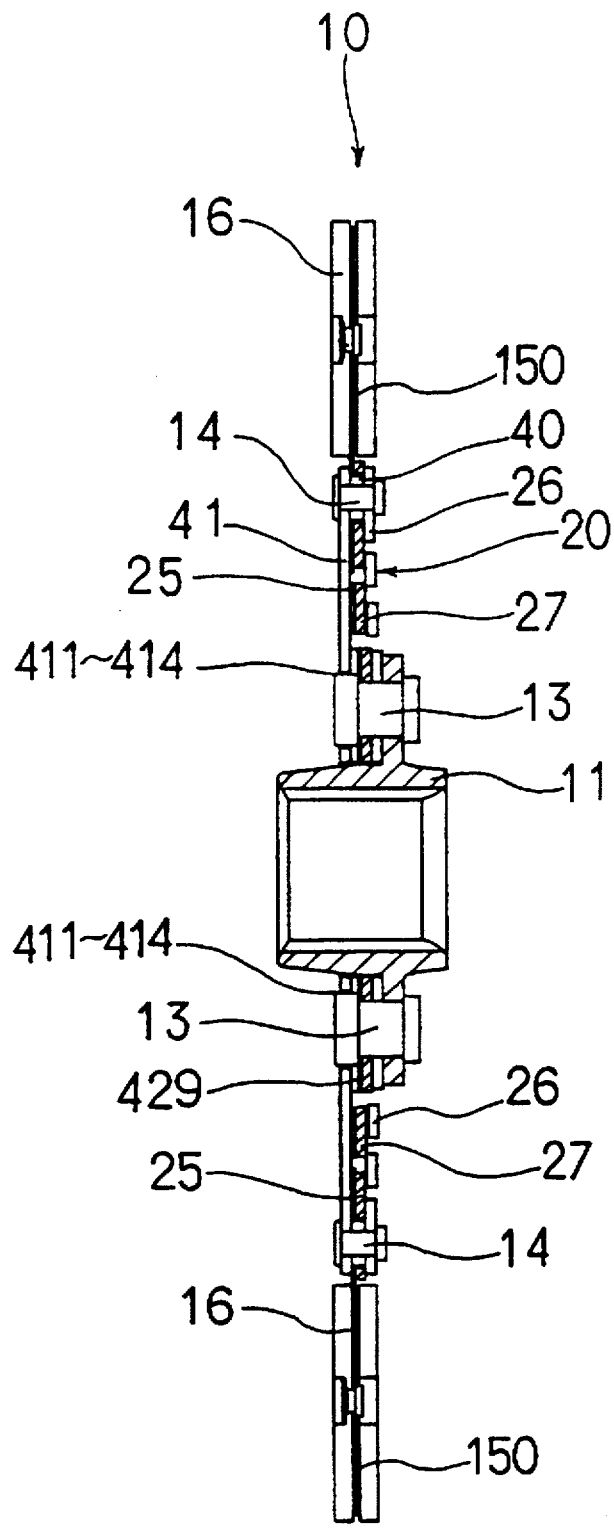
FIG. 11 is a side sectional view showing a clutch disc according to a sixth example.
Figure 12:
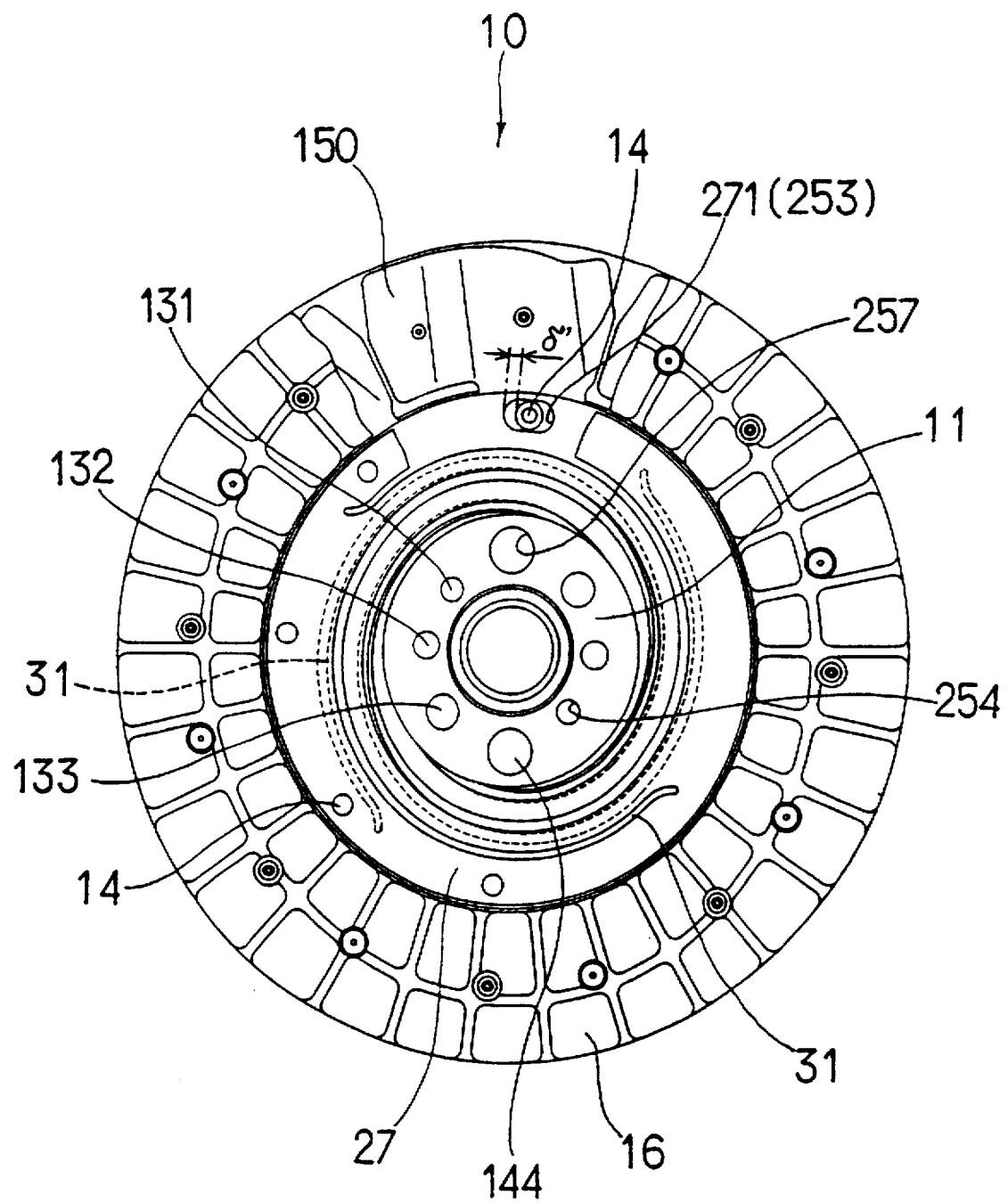
FIG. 12 is a view in which a right front portion of the clutch disc of the sixth example is cut away.

As shown in FIGS. 11 and 12, the damper member 20 comprises a damper plate 25 operating for a low torque, a 26 operating for an intermediate torque, and a 27 operating for a high torque. These damper plates 25, 26, and 27 are arranged side by side.

The damper plate 25 operating for the low torque is connected (not shown) with the disc spring 150 having the facing 16 mounted on its periphery. The inner periphery of the damper plate 25 is fixed to the clutch hub 11 by means of a first rivet 13. The damper plate 25 has an engaging hole 253 provided with a play interval δ'. When the angle of torsion of the damper plate 25 is 0, there is an interval δ', greater than a predetermined one, between a second rivet 14 and an edge of the engaging hole 253 as shown in FIG. 13, whereas when the angle of torsion of the damper plate 25 operating for a low torque has reached a predetermined one, the edge of the engaging hole 253 is brought into contact with the second rivet 14, as shown in FIG. 14.

The inner periphery of the damper plate 26 operating for the intermediate torque is fixed to the clutch hub 11 by means of the first rivet 13, while the periphery thereof is connected with the stopper plate 41 by means of the second rivet 14.

The damper plate 27 operating for the high torque has an engaging hole 271 provided with a play interval δ". When the angle of torsion of the damper plate 26 operating for the intermediate torque is 0, there is an interval δ" greater than a predetermined interval between the second rivet 14 and an edge of the engaging hole 271, whereas when the angle of torsion of the damper plates 25 operating for the low torque and that of damper plate 26 operating for the intermediate torque have reached a predetermined one, respectively, the edge of the engaging hole 271 is brought into contact with the second rivet 14, as shown in FIG. 14.

Consequently, the second rivet 14 does not contact the engaging hole 253 of the damper plate 25 in the interval 0-A shown in FIG. 15. Thus, the damper plates 26 and 27 are not concerned with the torsional characteristic of the clutch disc 10, but the damper plate 25 contributes to the generation of the torsional characteristic thereof.

When the angle of torsion is in the interval A-B shown in FIG. 15 beyond the angle (A), the second rivet 14 contacts the engaging hole 253 of the damper plate 25 but not the engaging hole 271 of the damper plate 27. Thus, the damper plate 27 is not concerned with the generation of the torsional characteristic of the clutch disc 10, while the damper plate 26 is twisted together with the damper plate 25 through the second rivet 14. Thus, in the interval A-B, damper plates 25 and 26 contribute to the generation of the torsional characteristic of the clutch disc 10.

When the angle of torsion is in the interval B-C shown in FIG. 15 beyond the angle (B), the second rivet 14 contacts the engaging holes 253 and 271. As a result, the damper plates 26 and 27 are twisted together with the damper plate 25 through the second rivet 14. Therefore, the damper plates 25, 26, and 27 contribute to the generation of the torsional characteristic of the clutch disc 10. Reference symbol δ' shown in FIG. 13 denotes the angle of torsion (A) of FIG. 15.

At the angle δ' of FIG. 13, the degree of hysteresis is small in the interval 0-A of FIG. 15 because slide does not occur between the stopper plate 41 and the thrust lining 429, whereas the degree of hysteresis is great in the interval A-C of FIG. 15 because sliding friction occurs between the stopper plate 41 and the thrust lining 429. Thus, a performance conforming to a characteristic demanded by a vehicle can be obtained. In the characteristic demanded by the vehicle, a small degree of hysteresis is favorable in a low torque region, while in intermediate and high torque regions, hysteresis for damping action is required.

In the sixth example, a pipe-shaped collar 40 is mounted on the second rivet 14, as shown in FIG. 11 to prevent the contact between the damper plates 25 and 27 in the axial direction thereof when the second rivet 14 is caulked.

Other constructions and operations of the sixth example are similar to those of the fifth example.

In the sixth example, preferably, the damper plate 25 operating for a low torque may be integrated with the disc spring 150 to eliminate the use of a member for clamping the disc spring 150 and the damper plate 25 to each other and produce a compact clutch disc.

(Seventh Example)

Figure 16:
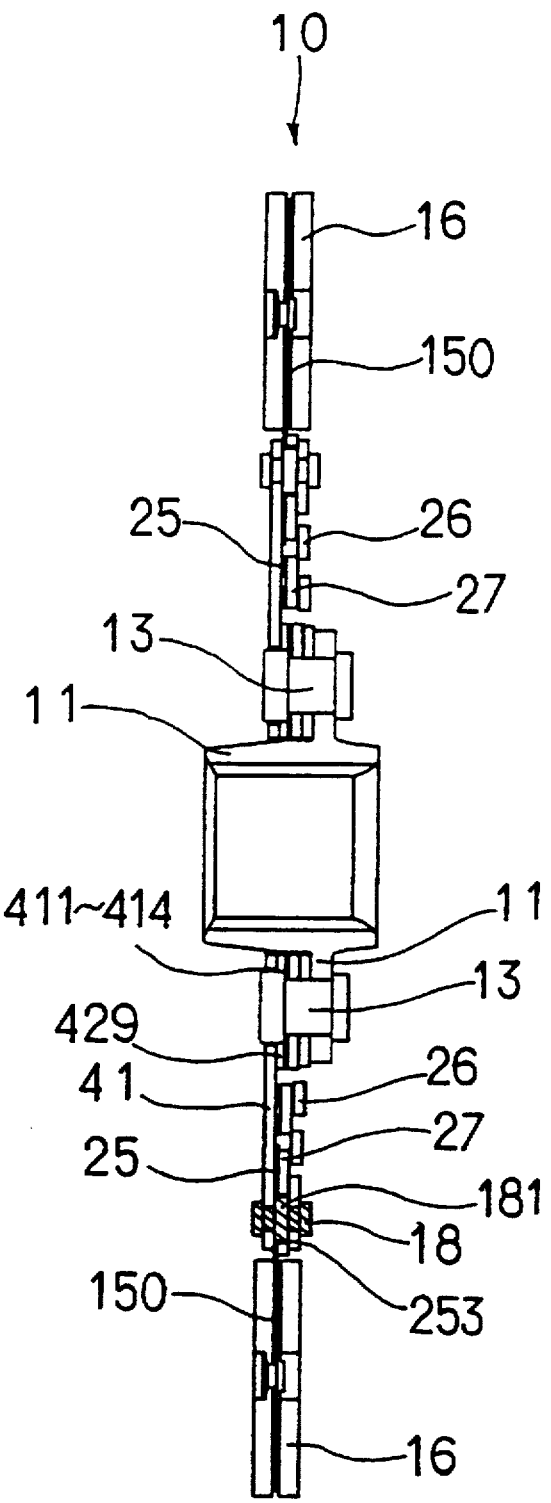
FIG. 16 is a side sectional view showing a clutch disc according to a seventh example.
Figure 17A:
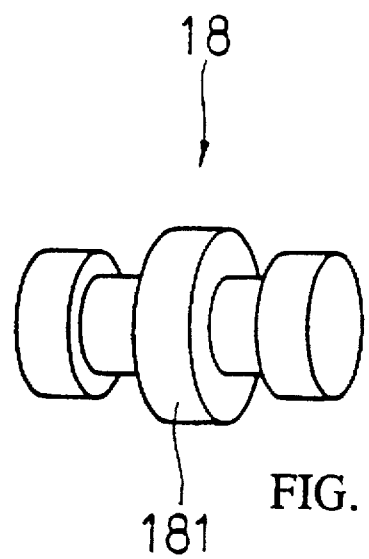
FIGS. 17(a) and 17(b) show a perspective view showing a second rivet according to the seventh example.
Figure 17B:
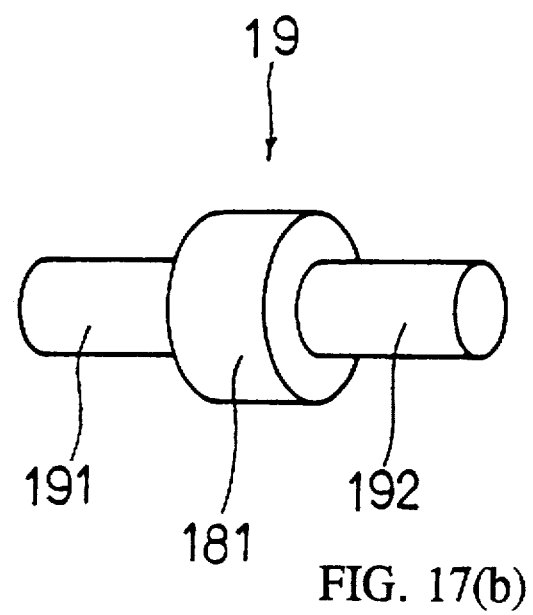

In the seventh example, as shown in FIGS. 16 and 17 (a), the configuration of the second rivet 14 of the sixth example is modified to form a second rivet 18 having a large-diameter barrel portion 181 formed in the center of the shaft thereof and the engaging hole 253 (see FIG. 9) of the damper plate 25 operating for the low torque is increased in correspondence to the large-diameter barrel portion 181.

The second rivet 18 is formed by caulking both ends 191 and 192 of a member 19 shown in FIG. 17 (b).

Other constructions and operations of the seventh example are similar to those of the sixth example.

(Eighth Example)

Figure 18:
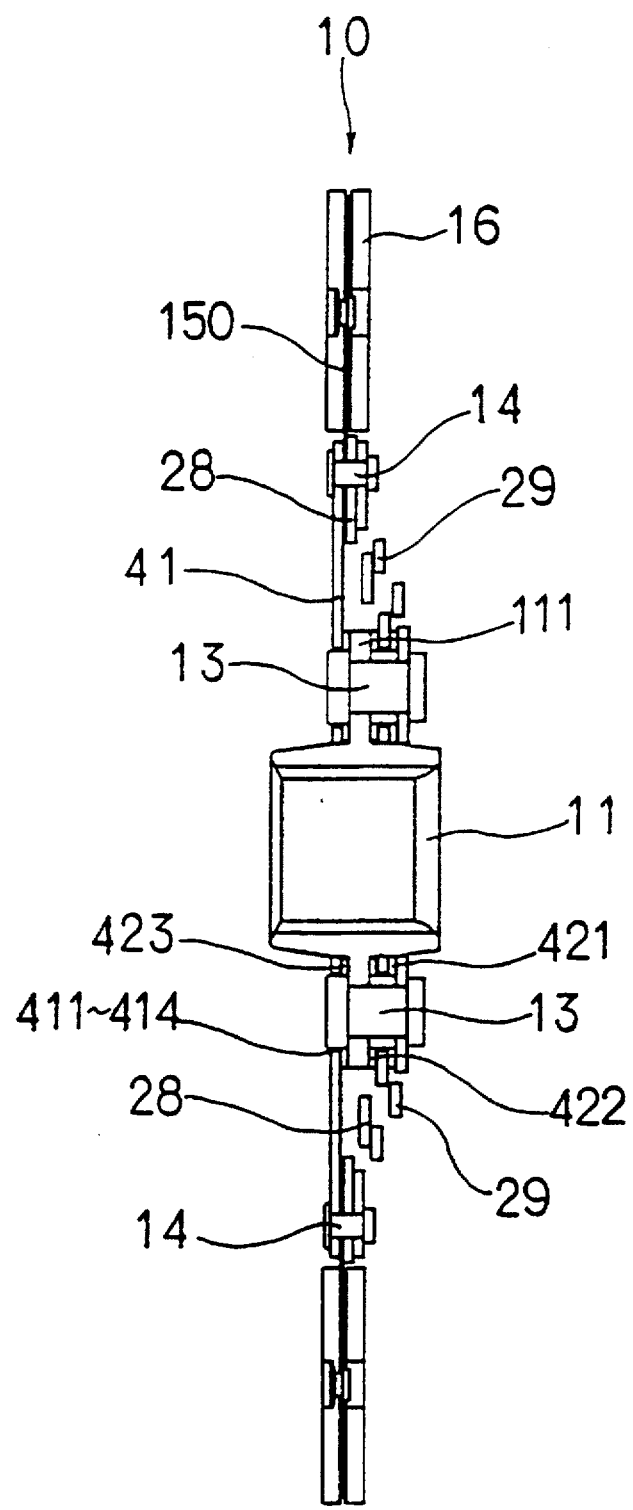
FIG. 18 is a side sectional view showing a clutch disc according to an eighth example.

In the eighth example which is a modification of the third example shown in FIG. 3, damper plates 28 and 29 are provided at both sides of the clutch hub to increase the thickness of the clutch disc in the axial direction thereof, as shown in FIG. 18.

A hysteresis characteristic is applied between the damper plates 28 and 29, between the stopper plate 41 and a flange 111 of the clutch hub 11, and between the damper plate 28 and the flange 111 of the clutch hub 11. In addition, thrust linings 421, 422, and 423 are mounted between the damper plates 28 and 29 to prevent the contact therebetween.

A first rivet hole of the damper plate 28 operating for the high torque is provided with a play gap between the second rivet and the edge thereof, similarly to the sixth example. Thus, the clutch disc of the eighth example has a two-stage torsional characteristic.

As described in the example 3, because the damper plates 28 and 29 are provided at both sides of the clutch hub to increase the thickness of the clutch disc in the axial direction thereof, the maximum angle of torsion θm of the damper plate 23 can be increased, with the size (diameter) and the allowable torque Tm fixed.

Figure 19:
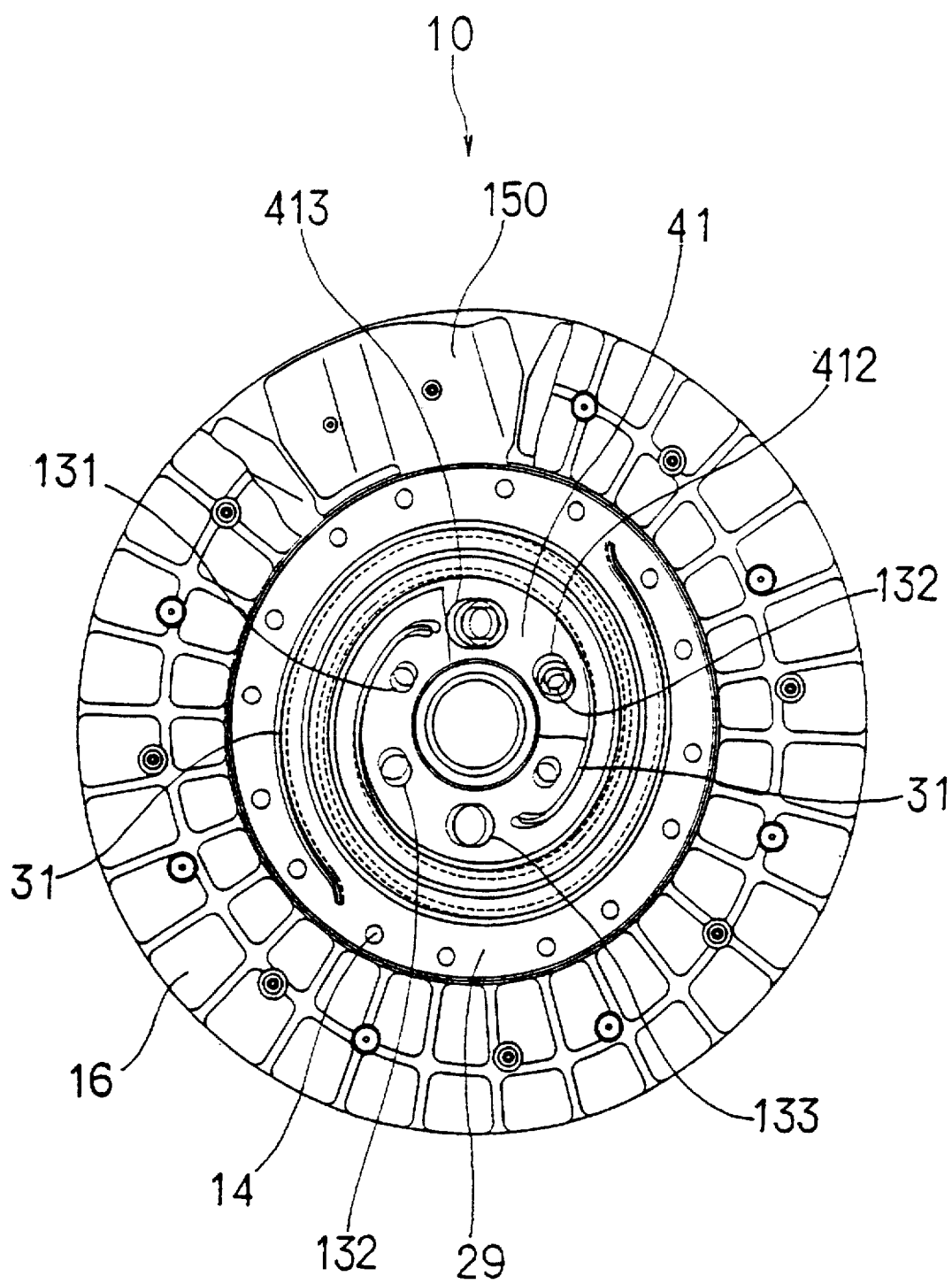
FIG. 19 is a view in which a right front portion of the clutch disc of the eighth example is cut away.
Figure 20:
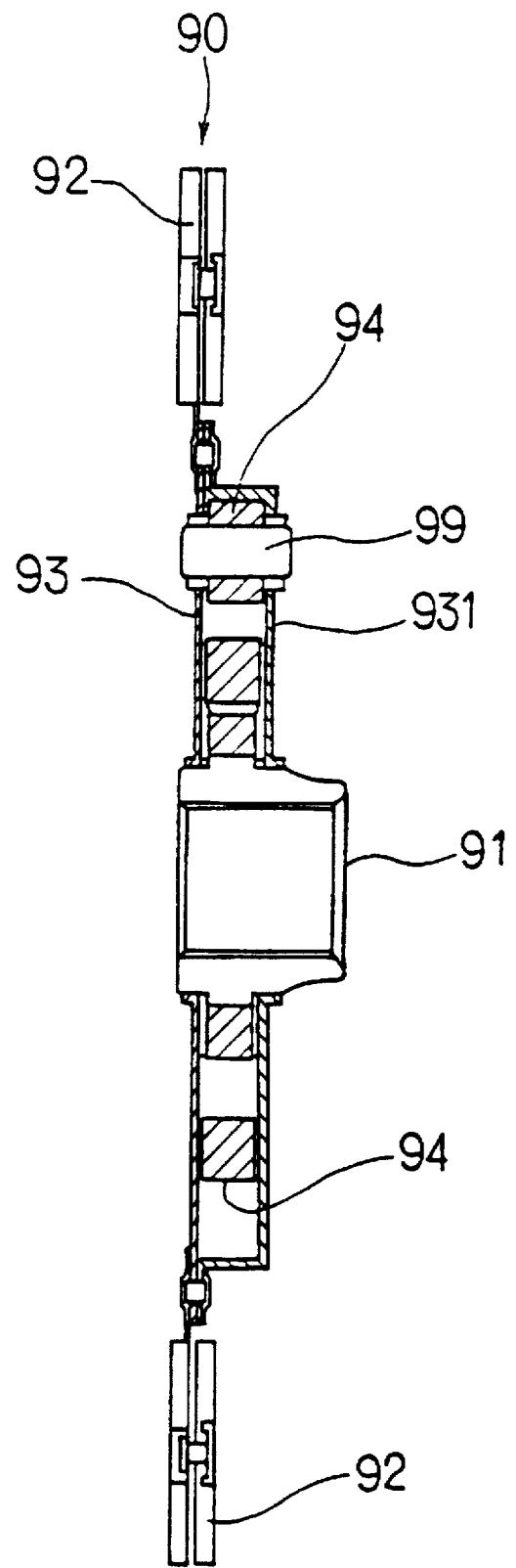
FIG. 20 is a side sectional view showing a conventional clutch disc.
Figure 21:
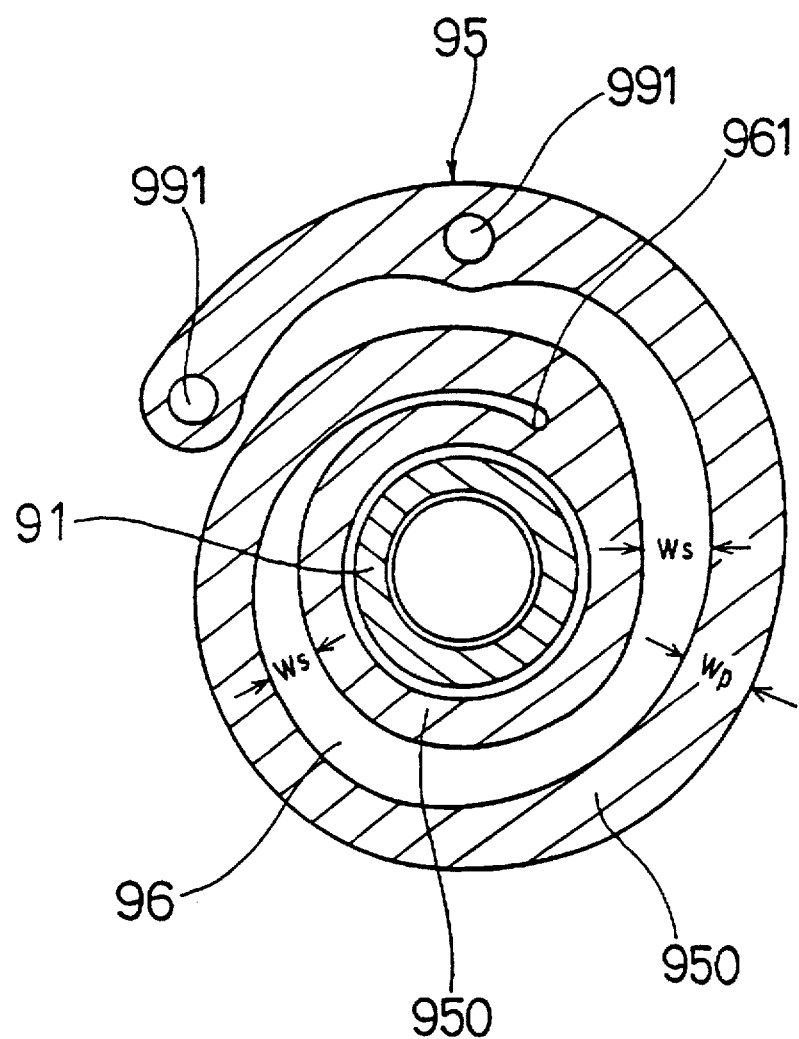
FIG. 21 is a front view showing a conventional damper plate.

FIG. 19 shows the mode of change of the slit 31, the first rivets 131 through 133, and the engaging holes 414 and 413 of the stopper plate 41 by broken lines and chain lines.

Other constructions and operations of the eighth example are similar to those of the sixth example.

(Ninth Example)

In the ninth example which is a modification of the eighth example, an elastic return force is applied between the inner periphery of the damper plates 28 and 29 and the periphery thereof in the axial direction thereof so as to apply a thrust load between the stopper plate 41 and the clutch hub 11 by the damper plates 28 and 29.

That is, the damper plates 28 and 29 of the eighth example is in a balanced state in the configuration shown in FIG. 18. An elastic return force acts only when the configuration shown in FIG. 18 changes, whereas the damper plates 28 and 29 of the ninth example have an elastic return force which acts in the direction in which the thickness (d) (see FIG. 5) is reduced in the axial direction of the clutch disc when the damper plates 28 and 29 are in the state shown in FIG. 18. Thus, a frictional force is generated between the clutch hub 11 and the stopper plate 41.

This construction eliminates the need for the provision of a friction member for applying a hysteresis characteristic to the torsional characteristic of the clutch disc, thus allowing the clutch disc to be light and manufacturing cost to be reduced.

Other constructions and operations of the ninth example are similar to those of the eighth example.

What is claimed is:

1. A clutch disc, constituting a friction clutch, comprising a clutch hub for being connected with an output shaft, a disc spring having a clutch facing mounted on a peripheral side thereof, and a damper member interposed between the clutch hub and the disc spring, thus applying a torsional characteristic to the clutch disc, the damper member having at least one elastically deformable damper plate;

said damper plate being formed as an annulus of elastic material, a surface of which is substantially perpendicular to a clutch axis and has at least one arc-like slit formed thereon centrifugally spirally in a range from an inner peripheral side of the annulus toward an outer peripheral side of the annulus; and the arc-like slit having a first curved portion formed by curving a portion of the slit proximate to an outer end of the slit such that the first curved portion is curved towards a radial direction and a second curved portion formed by curving a portion of the slit proximate to an inner end of the slit such that the second curved portion is curved towards a radial direction.

2. The clutch disc according to claim 1, wherein the damper plate has a plurality of first rivet holes through which rivets for fixing the damper plate to the clutch hub are inserted and which are formed in proximity to the inner peripheral side of the annulus and a plurality of second rivet holes through which rivets for fixing the damper plate to the disc spring are inserted and which are formed in proximity to the outer peripheral side thereof; the first and second rivet holes being formed at regular intervals concentrically, respectively; an inner end of the arc-like slit being positioned approximately intermediate between two adjacent first rivet holes, and an outer end of the arc-like slit being positioned approximately intermediate between two adjacent second rivet holes.

3. The clutch disc according to claim 1, wherein the surface of the annulus that is substantially perpendicular to the clutch axis has a plurality of arc-like slits formed thereon centrifugally spirally in a range from the inner peripheral side of the annulus toward the outer peripheral side of the annulus, the annulus having a plurality of first rivet holes through which rivets for fixing the damper plate to the clutch hub are inserted and which are formed in proximity to the inner peripheral side of the annulus, and the first rivet holes and rivets are centrifugally spirally arranged along portions of one of the arc-like slits positioned in proximity to the inner peripheral side of the annulus such that the radii of the first rivet holes and the distance between the one arc-like slit and the clutch axis decrease as the distance between the clutch axis and each of the first rivet holes decreases, and the radii of the first rivet holes and the distance between the one arc-like slit and the clutch axis increase as the distance between the clutch axis and each of the first rivet holes increases.

4. The clutch disc according to claims 1, including a plurality of damper plates each formed as an annulus of deformable material, a surface of each damper plate being perpendicular to the clutch axis and having at least one arc-like cut line or at least one arc-like slit formed thereon in a range from an inner peripheral side of the annulus toward an outer peripheral side thereof such that there is a dislocation between the inner periphery of the annulus and the outer periphery thereof in a direction parallel with the clutch axis to cause adjacent structures centrifugally spirally formed by the presence of the arc-like cut lines or the arc-like slits to be dislocated from each other in the axial direction of the clutch axis so that when the adjacent structures are dislocated radially from each other as a result of a circumferential twist applied thereto, the arc-like cut lines or the arc-like slits do not interfere with each other; and the structures are formed of an elastically deformable material, respectively.

5. The clutch disc according to claim 4, wherein an elastic return force is applied between the inner periphery of the annulus and the periphery thereof in the axial direction thereof so as to apply a thrust load between the damper plate and the clutch hub.

6. The clutch disc according to claim 1, including a plurality of damper plates each formed as an annulus of elastic material, a surface of each plate being substantially perpendicular to the clutch axis and having at least one arc-like slit formed thereon centrifugally spirally in a range from an inner peripheral side of the annulus toward an outer peripheral side of the annulus such that the damper plate has long and narrow plates formed between the adjacent arc-like slits by inclining the long and narrow plates with respect to a horizontal plane perpendicular to the clutch axis so as to axially space from each other faces of the long and narrow plates formed by the presence of the arc-like slits by more than the thicknesses of the long and narrow plates; and structures comprising the long and narrow plates being formed of an elastically deformable material, respectively.

7. The clutch disc according to claim 1, wherein the damper plate has a plurality of the arc-like slits.

8. The clutch disc according to claim 1, further comprising a stopper plate fixed to one of the disc spring and the clutch hub, and a plurality of stopper members connecting the damper plate one of the stopper plate and the clutch hub, wherein said damper plate has a plurality of limited rotation permitting cut-out portions or a plurality of limited rotation permitting engaging holes which each receive one of the stopper members and which are each dimensioned so that the stopper member is spaced from an edge of the cut-out portion or the engaging hole when the angle of torsion of the damper plate is zero, and so that the edge of the cut-out portion or the engaging hole is brought into contact with the stopper member when the angle of torsion of the damper plate has reached a predetermined angle of torsion.

9. The clutch disc according to claim 1, comprising first rivets for fixing the clutch hub and the damper member to each other and second rivets for fixing the disc spring and the damper member to each other, wherein the damper member has a plurality of damper plates including a damper plate to which a lower torque is assigned and a damper plate to which a higher torque is assigned; damper plates to which an intermediate torque and the higher torque are assigned being not fixed to the clutch hub or the disc spring; a stopper pin installed on an unfixed side of one of the adjacent damper plates to which the intermediate and higher torques are assigned; and a limited rotation permitting cut-out portion or a limited rotation permitting engaging hole which engages the stopper pin being formed on the other of the adjacent damper plates, and wherein only when the angle of torsion of the damper plate at the lower torque-applied side has reached a predetermined angle of torsion, the stopper pin is brought into contact with an edge of the limited rotation permitting cut-out portion or with an edge of the limited rotation permitting engaging hole.

10. The clutch disc according to claim 1, wherein the damper member has a plurality of damper plates including a damper plate to which a lower torque is assigned and a damper plate to which a higher torque is assigned; and the damper plate for applying a torsional characteristic to the clutch disc in a lower torque is integral with the disc spring.

11. A clutch disc, constituting a friction clutch, comprising a clutch hub for being connected with an output shaft, a disc spring having a clutch facing mounted on a peripheral side thereof, and a damper member interposed between the clutch hub and the disc spring, thus applying a torsional characteristic to the clutch disc, the damper member having at least one elastically deformable damper plate;

said damper plate being formed as an annulus of elastic material, the annulus having a surface which is substantially perpendicular to a clutch axis and having at least one arc-like slit formed thereon centrifugally spirally in a range from an inner peripheral side of the annulus toward an outer peripheral side of the annulus, the annulus having a plurality of first rivet holes through which rivets for fixing the damper plate to the clutch hub are inserted and which are formed in proximity to the inner peripheral side of the annulus, and the first rivet holes and the rivets being centrifugally spirally arranged along portions of the arc-like slit positioned in proximity to the inner peripheral side of the annulus by gradually increasing the distance between the clutch axis and each of the first rivet holes such that the radii of the first rivet holes decrease as the distance between the clutch axis and each first rivet hole decreases, and the radii of the first rivet holes increase as the distance between the clutch axis and each first rivet hole increases.

12. A clutch disc, constituting a friction clutch, comprising:

a clutch hub for being connected with an output shaft, a disc spring having a clutch facing mounted on a peripheral side thereof, and a damper member interposed between the clutch hub and the disc spring, thus applying a torsional characteristic to the clutch disc, the damper member having at least one elastically deformable damper plate;

said damper plate being formed as an annulus of elastic material, a surface of which is substantially perpendicular to a clutch axis and has at least one arc-like slit formed thereon centrifugally spirally in a range from an inner peripheral side of the annulus toward an outer peripheral side of the annulus; and the arc-like slit having a curved portion formed by centrifugally curving a portion of the slit proximate to an outer end of the slit such that the curved portion is curved towards a radial direction.

13. The clutch disc according to claim 12, wherein the damper plate has a plurality of first rivet holes through which rivets for fixing the damper plate to the clutch hub are inserted and which are formed in proximity to the inner peripheral side of the annulus and a plurality of second rivet holes through which rivets for fixing the damper plate to the disc spring are inserted and which are formed in proximity to the outer peripheral side thereof; the first and second rivet holes being formed at regular intervals concentrically, respectively; an inner end of the arc-like slit being positioned approximately intermediate between two adjacent first rivet holes, and an outer end of the arc-like slit being positioned approximately intermediate between two adjacent second rivet holes.

14. The clutch disc according to claim 12, wherein the surface of the annulus that is substantially perpendicular to the clutch axis has a plurality of arc-like slits formed thereon centrifugally spirally in a range from the inner peripheral side of the annulus toward the outer peripheral side of the annulus, the annulus having a plurality of first rivet holes through which rivets for fixing the damper plate to the clutch hub are inserted and which are formed in proximity to the inner peripheral side of the annulus, and the first rivet holes and rivets are centrifugally spirally arranged along portions of one of the arc-like slits positioned in proximity to the inner peripheral side of the annulus such that the radii of the first rivet holes and the distance between the one arc-like slit and the clutch axis decrease as the distance between the clutch axis and each of the first rivet holes decreases, and the radii of the first rivet holes and the distance between the one arc-like slit and the clutch axis increase as the distance between the clutch axis and each of the first rivet holes increases.

15. The clutch disc according to claims 12, including a plurality of damper plates each formed as an annulus of deformable material, a surface of each damper plate being perpendicular to the clutch axis and having at least one arc-like cut line or at least one arc-like slit formed thereon in a range from an inner peripheral side of the annulus toward an outer peripheral side thereof such that there is a dislocation between the inner periphery of the annulus and the periphery thereof in a direction parallel with the clutch axis to cause adjacent structures centrifugally spirally formed by the presence of the arc-like cut lines or the arc-like slits to be dislocated from each other in the axial direction of the clutch axis, so that when the adjacent structures are dislocated radially from each other as a result of a circumferential twist applied thereto, the arc-like cut lines or the arc-like slits do not interfere with each other; and the structures are formed of an elastically deformable material, respectively.

16. The clutch disc according to claim 12, including a plurality of damper plates each formed as an annulus of elastic material, a surface of each plate being substantially perpendicular to the clutch axis and having at least one arc-like slit formed thereon centrifugally spirally in a range from an inner peripheral side of the annulus toward an outer peripheral side of the annulus such that the damper plate has long and narrow plates formed between the adjacent arc-like slits by inclining the long and narrow plates with respect to a horizontal plane perpendicular to the clutch axis so as to axially space from each other faces of the long and narrow plates formed by the presence of the arc-like slits by more than the thicknesses of the long and narrow plates; and structures comprising the long and narrow plates being formed of an elastically deformable material, respectively.

17. The clutch disc according to claim 12, wherein the damper plate has a plurality of the arc-like slits.

18. The clutch disc according to claim 12, further comprising a stopper plate fixed to one of the disc spring and the clutch hub, and a plurality of stopper members connecting the damper plate to one of the stopper plate and the clutch hub, wherein said damper plate has a plurality of limited rotation permitting cut-out portions or a plurality of limited rotation permitting engaging holes in each of which is positioned one of the stopper members and which are each dimensioned so that the stopper member positioned in the cut-out portion or the engaging hole is spaced from an edge of the cut-out portion or the engaging hole when the angle of torsion of the damper plate is zero, and so that the edge of the cut-out portion or the engaging hole is brought into contact with the stopper member when the angle of torsion of the damper plate has reached a predetermined angle of torsion.

19. The clutch disc according to claim 12, comprising first rivets for fixing the clutch hub and the damper member to each other and second rivets for fixing the disc spring and the damper member to each other, wherein the damper member has a plurality of damper plates including a damper plate to which a lower torque is assigned and a damper plate to which a higher torque is assigned; damper plates to which an intermediate torque and the higher torque are assigned being not fixed to the clutch hub or the disc spring; a stopper pin installed on an unfixed side of one of the adjacent damper plates to which the intermediate and higher torques are assigned; and a limited rotation permitting cut-out portion or a limited rotation permitting engaging hole which engages the stopper pin being formed on the other of the adjacent damper plates, and wherein only when the angle of torsion of the damper plate at the lower torque-applied side has reached a predetermined angle of torsion, the stopper pin is brought into contact with an edge of the play interval-provided cut-out portion or with an edge of the play interval-provided engaging hole.

20. The clutch disc according to claim 12, wherein the damper member has a plurality of damper plates including a damper plate to which a lower torque is assigned and a damper plate to which a higher torque is assigned; and the damper plate for applying a torsional characteristic to the clutch disc in a lower torque is integral with the disc spring.

* * * * *